(12) United States Patent
Srinivasan et al.

(10) Patent No.: US 9,598,600 B2
(45) Date of Patent: Mar. 21, 2017

(54) MODIFIED PHENOLIC RESINS FOR MAKING COMPOSITE PRODUCTS

(71) Applicant: Georgia-Pacific Chemicals LLC, Atlanta, GA (US)

(72) Inventors: Ramji Srinivasan, Johns Creek, GA (US); Benjamin D. Gapud, Snellville, GA (US); Kelly A. Shoemake, Atlanta, GA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 206 days.

(21) Appl. No.: 14/490,108

(22) Filed: Sep. 18, 2014

(65) Prior Publication Data

US 2015/0086803 A1  Mar. 26, 2015

Related U.S. Application Data

(60) Provisional application No. 61/880,475, filed on Sep. 20, 2013.

(51) Int. Cl.

| | |
|---|---|
| *D21H 25/06* | (2006.01) |
| *C09D 161/06* | (2006.01) |
| *B32B 37/18* | (2006.01) |
| *B32B 38/00* | (2006.01) |
| *B32B 38/08* | (2006.01) |
| *C08K 5/1545* | (2006.01) |
| *D21H 25/02* | (2006.01) |
| *C09D 105/00* | (2006.01) |
| *D21H 27/24* | (2006.01) |
| *D21H 17/02* | (2006.01) |
| *D21H 17/48* | (2006.01) |
| *D21H 23/22* | (2006.01) |
| *C08G 8/10* | (2006.01) |
| *C08L 61/06* | (2006.01) |

(52) U.S. Cl.
CPC ............ *C09D 161/06* (2013.01); *B32B 37/18* (2013.01); *B32B 38/0012* (2013.01); *B32B 38/08* (2013.01); *C08K 5/1545* (2013.01); *C09D 105/00* (2013.01); *D21H 17/02* (2013.01); *D21H 17/48* (2013.01); *D21H 25/02* (2013.01); *D21H 25/06* (2013.01); *D21H 27/24* (2013.01); *B32B 2317/18* (2013.01); *B32B 2386/00* (2013.01); *C08G 8/10* (2013.01); *C08L 61/06* (2013.01); *D21H 23/22* (2013.01); *Y10T 156/1044* (2015.01); *Y10T 428/31949* (2015.04)

(58) Field of Classification Search
CPC ...... C09D 161/06; D21H 25/06; B32B 37/18; B32B 38/0012
USPC ............... 428/526; 156/222; 427/342, 389.9
See application file for complete search history.

(56) References Cited

U.S. PATENT DOCUMENTS

| | | | |
|---|---|---|---|
| 2,641,584 A | 6/1953 | Martone, Jr. | |
| 3,220,916 A | 11/1965 | Petropoulos | |
| 3,616,021 A | 10/1971 | Valerius | |
| 4,005,239 A | 1/1977 | Davis et al. | |
| 4,076,566 A | 2/1978 | Power | |
| 4,251,408 A * | 2/1981 | Hesse | B24D 3/285 51/295 |
| 4,473,613 A | 9/1984 | Jaisle et al. | |
| 4,530,883 A | 7/1985 | Knapp et al. | |
| 4,636,443 A | 1/1987 | Jaisle et al. | |
| 4,713,299 A | 12/1987 | Taylor et al. | |
| 4,778,510 A | 10/1988 | Hawkins | |
| 5,456,949 A | 10/1995 | Albrinck et al. | |
| 5,674,971 A | 10/1997 | Graves | |
| 5,795,934 A | 8/1998 | Parks | |
| 6,030,673 A * | 2/2000 | Andersen | B29C 55/18 156/78 |
| 6,114,491 A * | 9/2000 | Dupre | C08G 12/422 428/505 |
| 6,245,438 B1 | 6/2001 | Dupre et al. | |
| 6,706,845 B2 | 3/2004 | Ingram et al. | |
| 6,822,042 B2 * | 11/2004 | Capps | C08G 18/6484 428/292.4 |
| 7,081,300 B2 | 7/2006 | Laurence et al. | |
| 8,299,153 B2 * | 10/2012 | Kelly | C08L 33/02 427/385.5 |
| 9,163,169 B2 * | 10/2015 | Balogh | C09J 161/12 |
| 2011/0064918 A1 * | 3/2011 | Andriessen | B31F 1/2809 428/182 |
| 2011/0198028 A1 * | 8/2011 | Pedersen | C09J 161/32 156/310 |
| 2011/0220835 A1 * | 9/2011 | Swift | C07H 5/04 252/62 |
| 2012/0183723 A1 * | 7/2012 | Srinivasan | C08G 73/028 428/106 |
| 2012/0252936 A1 * | 10/2012 | Kruger | C09J 133/20 524/28 |
| 2012/0252937 A1 * | 10/2012 | Cannon | C08J 5/043 524/58 |

(Continued)

*Primary Examiner* — Douglas McGinty
(74) *Attorney, Agent, or Firm* — Ram W. Sabnis

(57) ABSTRACT

Methods for making phenolic resins modified with one or more monosaccharides and methods for making composite products therewith are provided. In at least one specific embodiment, a method for making a composite product can include contacting a plurality of cellulosic sheets with a resin composition that includes a phenolic resin and a monosaccharide. The resin composition can include about 0.5 wt % to about 30 wt % of the monosaccharide, based on a combined weight of the phenolic resin and the monosaccharide. The method can also include at least partially curing the resin composition to produce a composite product.

20 Claims, No Drawings

(56) References Cited

U.S. PATENT DOCUMENTS

2013/0240114 A1\* 9/2013 Balogh .................. C09J 161/12
156/62.6

\* cited by examiner

MODIFIED PHENOLIC RESINS FOR MAKING COMPOSITE PRODUCTS

CROSS-REFERENCE TO RELATED APPLICATION

This application claims priority to U.S. Provisional Patent Application having Ser. No. 61/880,475, filed on Sep. 20, 2013, which is incorporated by reference herein.

BACKGROUND

Field

Embodiments described generally relate to modified phenolic resins and methods for making and using same. More particularly, such embodiments relate to phenolic resins modified with one or more monosaccharides and methods for making composite products.

Description of the Related Art

Phenolic resins are well-known adhesives that can be used for making laminated products, such as decorative laminates. Some laminates are made for flat surfaces and articles with gently rounded surfaces and contours, and other laminates are made and then post-formed into more complex shapes with sharper edges. Decorative laminates that are made from post-forming laminates are generally made of a plurality of heat-moldable sheets impregnated with phenolic resins and/or melamine resins. The resins are not completely cured after molding to a surface but are brought to their final angled shape by bending the laminate, heating the phenolic resin and/or melamine resin impregnated sheets, and applying pressure to further cure the resin. Decorative laminates can be used for counter tops, where the front edge is formed into a lip and the back edge is formed up into a back-splash area.

The use of phenolic resins in the manufacture of post-formable laminates has drawbacks. For example, one problem is the partially cured phenolic resin in post-formable laminates is prone to cracking and breaking when bending the laminates to their final shape; hence, they can be difficult to cut-to-size, machine, and install. Another problem with phenolic resins is the release of volatile components into the atmosphere often during the B-staging process. One of these volatile components is phenol. One method to reduce the free phenol level in the base phenol-formaldehyde resin is to increase the amount of formaldehyde (relative to the phenol) in the resin. Unfortunately, this usually results in a more brittle resin that is unacceptable for manufacturing post-forming laminates.

There is a need, therefore, for improved resins and methods for using same in the manufacture of composite products such as post-formable laminates.

SUMMARY

Methods for making phenolic resins modified with one or more monosaccharides and methods for making composite products therewith are provided. In at least one specific embodiment, a method for making a composite product can include contacting a plurality of cellulosic sheets with a resin composition that includes a phenolic resin and a monosaccharide. The resin composition can include about 0.5 wt % to about 30 wt % of the monosaccharide, based on a combined weight of the phenolic resin and the monosaccharide. The method can also include at least partially curing the resin composition to produce a composite product.

In at least one other specific embodiment, a method form making a composite product can include contacting a plurality of cellulosic sheets with a resin composition that includes a phenol-formaldehyde resin and glucose. The phenol-formaldehyde resin can have a molar ratio of formaldehyde to phenol of about 1.1:1 to about 4:1 and a viscosity of about 30 cP to about 500 cP at a temperature of 25° C. The method can also include at least partially curing the resin composition to produce a post-formable laminate. The method can also include heating the post-formable laminate to a temperature of about 135° C. to about 220° C. for about 3 seconds to about 60 seconds. The method can also include bending the post-formable laminate while heated to the temperature of about 135° C. to about 220° C. to produce a post-formed composite product.

In at least one specific embodiment, a composite product can include a plurality of cellulosic sheets and an at least partially cured resin composition. Prior to curing, the resin composition can include one or more phenolic resins and one or more monosaccharides. The resin composition can include about 0.5 wt % to about 30 wt % of the monosaccharide, based on a combined weight of the phenolic resin and the monosaccharide.

DETAILED DESCRIPTION

It has been surprisingly and unexpectedly discovered that combining one or more monosaccharides with one or more phenolic resins can produce a resin composition that can significantly improve the post-forming characteristics or properties of composite products made therefrom. For example, composite products made with the resin composition that includes a phenolic resin and a monosaccharide can have a flexibility that allows the composite product to be post-formed, e.g., bent, folded, curved, or otherwise formed to have a corner or edge having a tight radius or other curvature, with negligible or no cracking or crazing. While not wishing to be bound by theory, it is believed that the monosaccharide acts or serves as a reactive extender and/or a plasticizer for the phenolic resin. The composite product produced with the resin composition can be tougher, more post-formable, and/or more resistant to chipping and breaking during machining steps relative to a comparative composite product made the same way, but without the monosaccharide.

One surprising and unexpected improvement in the composite product can be the ability to bend the composite product in the cross-direction to a relatively small or "tight" radius. For example, the composite product prepared with the resin composition can be bent along the cross-direction to a 90° bend having a radius of 4 mm or less, 3.8 mm or less, 3.5 mm or less, 3.3 mm or less, 3.2 mm or less, 3.175 mm or less, 3 mm or less, 2.9 mm or less, 2.8 mm or less, 2.7 mm or less, 2.6 mm or less, or 2.5 mm or less. In another example, the composite product prepared with the resin composition can be bent along the cross-direction to a 90° bend having a radius of about 2.5 mm to about 2.8 mm, about 2.7 mm to about 3.3 mm, about 2.8 mm to about 3.0 mm, about 2.9 mm to about 3.6 mm, about 3.0 mm to about 3.2 mm, about 3.175 mm to about 3.25 mm, about 3.25 mm to about 3.5 mm, about 3.3 mm to about 4 mm, about 3.5 mm to about 3.75 mm, about 3.6 mm to about 4.8 mm, about 3.75 mm to about 4 mm, about 4 mm to about 4.5 mm, about 4.5 mm to about 4.8 mm, about 4.8 mm to about 5 mm, about 5 mm to about 5.5 mm. In another example, the composite product prepared with the resin composition can be bent along the cross-direction to a bend having a radius of about 2 mm, about 2.1 mm, about 2.2 mm, about 2.3 mm, about 2.4 mm, about 2.5 mm, about 2.6 mm, about 2.7 mm, about 2.8 mm, about 2.9 mm, about 3 mm, about 3.1 mm, about 3.2 mm, about 3.3 mm, about 3.4 mm, about 3.5 mm, about 3.6 mm, about 3.7 mm, about 3.8 mm, about 3.9 mm, about 4 mm, or greater without any cracking or crazing. In another example, the composite product prepared with the resin composition can be bent along the cross-direction to a 90° bend having a radius of less than 4 mm, less than 3.8 mm, less than 3.5 mm, less than 3.3 mm, less than 3.2 mm, less than 3.175 mm, less than 3 mm, less than 2.9 mm, less than 2.8 mm, less than 2.7 mm, less than 2.6 mm, or less than 2.5 mm without any cracking or crazing. The bending of the composite product along the cross-direction can be measured according to the test apparatus and procedure of NEMA test 3.14, from Standard NEMA Publications Book LD3-2005. The composite product can be bent while at a temperature of about 162.8° C. (about 325° F.). The determination of whether or not the composite product has any cracks or crazing after bending can be made by visual observation.

Another surprising and unexpected improvement in the composite product can be the ability to bend the composite product in the machine direction to a relatively small or "tight" radius. For example, the composite product prepared with the resin composition can be bent along the machine direction to a bend having a radius of 4 mm or less, 3.7 mm or less, 3.5 mm or less, 0.3 mm or less, 3 mm or less, 2.7 mm or less, 2.5 mm or less, 2.3 mm or less, 2 mm or less, 1.8 mm or less, 1.5 mm or less, 1.2 mm or less, 1.1 mm or less, or 1 mm or less. In another example, the composite product prepared with the resin composition can be bent along the machine direction to a bend having a radius of about 3 mm to about 4 mm, about 3 mm to about 3.5 mm, about 2.5 mm to about 3 mm, about 2 mm to about 2.5 mm, about 1.5 mm to about 2 mm, about 1.2 mm to about 1.5 mm, about 1 mm to about 1.2 mm, about 1.1 mm to about 1.3 mm. In another example, the composite product prepared with the resin composition can be bent along the machine direction to a 90.degree. bend having a radius of about 0.7 mm, about 0.8 mm, about 0.9 mm, about 1 mm, about 1.1 mm, about 1.2 mm, about 1.3 mm, about 1.4 mm, about 1.5 mm, about 1.6 mm, about 1.7 mm, about 1.8 mm, about 1.9 mm, about 2 mm, about 2.1 mm, about 2.2 mm, about 2.3 mm, about 2.4 mm, about 2.5 mm, about 2.6 mm, about 2.7 mm, about 2.8 mm, about 2.9 mm, about 3 mm, or greater without any cracking or crazing. In another example, the composite product prepared with the resin composition can be bent along the machine direction to a 90.degree. bend having a radius of less than 4 mm, less than 3.7 mm, less than 3.5 mm, less than 0.3 mm, less than 3 mm, less than 2.7 mm, less than 2.5 mm, less than 2.3 mm, less than 2 mm, less than 1.8 mm, less than 1.5 mm, less than 1.2 mm, less than 1.1 mm, or less than 1 mm without any cracking or crazing. In another example, a 90.degree. bend along the machine direction having a radius of about 0.8 mm to about 4 mm, about 0.9 mm to about 1.5 mm, about 0.8 mm to about 1.1 mm, about 1 mm to about 1.2 mm, or about 1 mm to about 2 mm can be formed without any cracking or crazing. The bending of the composite product along the machine direction can be measured according to the test apparatus and procedure of NEMA test 3.14, from Standard NEMA Publications Book LD3-2005. The composite product can be bent while at a temperature of about 162.8° C. (about 325° F.). The determination of whether or not the composite product has any cracks or crazing after bending can be made by visual observation.

Another surprising and unexpected improvement in the composite product can be a significant reduction in the emission or release rate of formaldehyde. For example, a composite product made with the resin composition that includes the phenolic resin and the monosaccharide can have a significantly lower rate of formaldehyde emission relative to a comparative product made with the same phenolic resin, but without the monosaccharide. The emission or release rate of formaldehyde from the composite product can be measured according to the test apparatus and procedure of Desiccator Method ISO/DIS 12460-4.

The composite product prepared with the resin composition can have a formaldehyde emission of about 0.01 mg/L, about 0.05 mg/L, about 0.07 mg/L, about 0.1 mg/L, about 0.2 mg/L, about 0.3 mg/L, about 0.5 mg/L, or about 1 mg/L to about 3 mg/L, about 4 mg/L, about 5 mg/L, about 6 mg/L, about 7 mg/L, about 7.5 mg/L, about 8 mg/L, about 9 mg/L, or about 10 mg/L, after 3:1 dilution of the chromatropic acid solution, with desiccator testing at 25° C. and 16 hours. In another example, the composite product prepared with the resin composition can have a formaldehyde emission of about 0.1 mg/L to about 0.6 mg/L, about 0.5 mg/L to about 1.5 mg/L, about 1.4 mg/L to about 3 mg/L, about 2.1 mg/L to about 4 mg/L, about 3.5 mg/L to about 4.6 mg/L, about 5.5 mg/L to about 6.6 mg/L, about 6 mg/L to about 7 mg/L, about 6.5 mg/L to about 8 mg/L, or about 7.5 mg/L to about 10 mg/L, after 3:1 dilution of the chromatropic acid solution, with desiccator testing at 25° C. and 16 hours. In another example, the composite product can have a formaldehyde emission of less than 6.7 mg/L, less than 6.5 mg/L, less than 6.3 mg/L, less than 6 mg/L, less than 5.7 mg/L, less than 5.5 mg/L, less than 5.3 mg/L, less than 5 mg/L, less than 4.7 mg/L, less than 4.5 mg/L, less than 4.3 mg/L, less than 4 mg/L, less than 3.7 mg/L, less than 3.5 mg/L, less than 3.3 mg/L, less than 3 mg/L, less than 2.7 mg/L, less than 2.5 mg/L, less than 2.3 mg/L, less than 2 mg/L, less than 1.9 mg/L, less than 1.8 mg/L, less than 1.7 mg/L, less than 1.6 mg/L, less than 1.5 mg/L, less than 1.4 mg/L, less than 1.3 mg/L, less than 1.2 mg/L, less than 1.1 mg/L, less than 1 mg/L, less than 0.9 mg/L, less than 0.8 mg/L, less than 0.7 mg/L, less than 0.6 mg/L, less than 0.5 mg/L, less than 0.4 mg/L, less than 0.3 mg/L, less than 0.2 mg/L, or less than 0.1 mg/L, after 3:1 dilution of the chromatropic acid solution, with desiccator testing at 25° C. and 16 hours. In another example, the composite product can have a formaldehyde emission of less than 10 mg/L, less than 9.5 mg/L, less than 9 mg/L, less than 8.5 mg/L, less than 8 mg/L, less than 7.5 mg/L, less than 7 mg/L, less than 6.7 mg/L, less than 6.5 mg/L, less than 6.3 mg/L, less than 6 mg/L, less than 5.7 mg/L, less than 5.5 mg/L, less than 5.3 mg/L, less than 5 mg/L, less than 4.7 mg/L, less than 4.5 mg/L, less than 4.3 mg/L, less than 4 mg/L, less than 3.7 mg/L, less than 3.5 mg/L, less than 3.3 mg/L, less than 3 mg/L, less than 2.7 mg/L, less than 2.5 mg/L, less than 2.3 mg/L, less than 2 mg/L, less than 1.9 mg/L, less than 1.8 mg/L, less than 1.7 mg/L, less than 1.6 mg/L, less than 1.5 mg/L, less than 1.4 mg/L, less than 1.3 mg/L, less than 1.2 mg/L, less than 1.1 mg/L, less than 1 mg/L, less than 0.9 mg/L, less than 0.8 mg/L, less than 0.7 mg/L, less than 0.6 mg/L, less than 0.5 mg/L, less than 0.4 mg/L, less than 0.3 mg/L, less than 0.2 mg/L, or less than 0.1 mg/L, as measured according to Desiccator Method ISO/DIS 12460-4. In still another example, the composite product can have a formaldehyde emission of about 0.01 mg/L, about 0.05 mg/L, or about 0.1 mg/L to less than 3 mg/L, less than 4 mg/L, less than 5 mg/L, less than 6 mg/L, less than 6.5 mg/L, or less than 6.7 mg/L, as measured according to Desiccator Method ISO/DIS 12460-4.

Another surprising and unexpected improvement in the composite product can be percent swelling or "% swelling." For example, the composite product prepared with the resin composition can have maximum % swelling of 25%, 23%, 20%, 17%, 15%, 12%, 11%, 10%, 9%, or 8%. In another example, the composite product prepared with the resin composition can have % swelling of about 8% to about 12%, about 10% to about 14%, about 12% to about 15%, about 13% to about 17%, about 15% to about 18%, about 16% to about 21%, about 18% to about 20%, or about 20% to about 23%. The % swelling of the composite product can be measured according to the test apparatus and procedure of NEMA test 3.5, from Standard NEMA Publications Book LD3-2005.

Another surprising and unexpected improvement in the composite product can be the percent of moisture absorption or "% moisture absorption." For example, the composite product can have a % moisture absorption of about 24%, about 23%, about 22%, about 21%, about 20%, about 19%, about 18%, about 17%, about 16%, about 15%, about 14%, about 13%, about 12%, about 11%, about 10%, about 9%, about 8%, or about 7%. In another example, the composite product can have a % moisture absorption of 8% to about 10%, about 9% to about 13%, about 10% to about 15%, about 12% to about 16%, about 14% to about 17%, about 16% to about 18%, about 15% to about 19%, about 18% to about 20%, about 17% to about 21%, about 20% to about 22%, or about 21% to about 23%. In another example, the composite product can have a % moisture absorption of 21% or less, 19% or less, 17% or less, 15% or less, 13% or less, 12% or less 11% or less, 10% or less. The composite product prepared with the resin composition can have a % moisture absorption over limit of 21%. The % moisture absorption of the composite product can be measured according to the test apparatus and procedure of NEMA test 3.5, from Standard NEMA Publications Book LD3-2005.

The composite product can have a blister time of more than 30 seconds, more than 40 seconds, more than 42 seconds, more than 44 seconds, more than 46 seconds, more than 48 seconds, more than 50 seconds, more than 52 seconds, more than 55 seconds, more than 57 seconds more than 60 seconds, more than 65 seconds, more than 70 seconds, more than 75 seconds, more than 80 seconds, more than 85 seconds, or more than 90 seconds. In another example, the composite product can have a blister time of 30 seconds to about 40 seconds, about 40 seconds to about 50 seconds, about 45 seconds to about 65 seconds, about 50 seconds to about 60 seconds, about 60 seconds to about 70 seconds, or about 40 seconds to about 90 seconds. The blister time of the composite product can be measured according to the test apparatus and procedure of NEMA test 3.15, from Standard NEMA Publications Book LD3-2005.

The monosaccharide can be mixed, blended, added, or otherwise combined with the phenolic resin to provide the resin composition. The monosaccharide can be combined with the phenolic resin at any time during the synthesis of the phenolic resin and/or after the phenolic resin has been prepared. For example, in making a phenolic resin, the monosaccharide can be combined with a phenol component and an aldehyde component, with a prepolymer, and/or with the phenolic resin to produce the resin composition. The resin composition can have a monosaccharide concentration of about 0.5 wt %, about 3 wt %, about 5 wt %, about 7 wt %, or about 10 wt % to about 15 wt %, about 20 wt %, about 22 wt %, about 25 w %, about 27 wt %, or about 30 wt %, based on the combined weight of the phenolic resin and the monosaccharide. For example, the resin composition can include about 0.5 wt % to about 2 wt %, about 0.5 wt % to about 20 wt %, about 2 wt % to about 5 wt %, about 4 wt % to about 8 wt %, about 5 wt % to about 10 wt %, about 7 wt % to about 12 wt %, about 10 wt % to about 15 wt %, about 14 wt % to about 18 wt %, about 17 wt % to about 22 wt %, or about 15 wt % to about 22 wt % of the monosaccharide, based on the combined weight of the phenolic resin and the monosaccharide. In another example, the resin composition can include about 1.5 wt % to about 7 wt %, about 3 wt % to about 8 wt %, about 5 wt % to about 11 wt %, about 5 wt % to about 8 wt %, about 6 wt % to about 7.5 wt %, about 9 wt % to about 15 wt %, about 11 wt % to about 13 wt %, about 7 wt % to about 21 wt %, or about 11 wt % to about 20 wt % of the monosaccharide, based on the combined weight of the phenolic resin and the monosaccharide. In another example, the monosaccharide can be combined with the phenolic resin in an amount of about 0.1 moles, about 0.3 moles, about 0.4 moles, about 0.6 moles, or about 0.7 moles to about 1 mole, about 1.2 moles, about 1.4 moles, about 1.6 moles, about 1.8 moles, or about 2 moles per mole of phenolic component. The addition of the monosaccharide, which can react with the phenolic resin, can reduce the concentration of free phenol and/or other volatile phenolic moiety levels of the phenolic resin.

The monosaccharide can be or include, but is not limited to, a triose, a tetrose, a pentose, a hexose, a heptose, or any mixture thereof. The monosaccharide can be in the aldose or ketose form. Illustrative monosaccharides can include, but are not limited to, glyceraldehyde, dihydroxyacetone, erythrose, threose, erythrulose, ribose, arabinose, xylose, lyxose, ribulose, arabulose, xylulose, lyxulose, glucose (dextrose), mannose, galactose, allose, altrose, talose, gulose, idose, fructose, psicose, dendroketose, sorbose, tagatose, gentiobiose, sedoheptulose, or any mixture thereof. In at least one example, the monosaccharide can be or can include glucose.

In one or more embodiments, the resin composition can include less than 3 wt %, less than 2 wt %, less than 1 wt %, less than 0.7 wt %, less than 0.5 wt %, less than 0.3 wt %, or less than 0.1 wt % of any disaccharide, based on the total weight of the resin composition. In one or more embodiments, the resin composition can include less than 3 wt %, less than 2 wt %, less than 1 wt %, less than 0.7 wt %, less than 0.5 wt %, less than 0.3 wt %, or less than 0.1 wt % of any oligosaccharide, based on the total weight of the resin composition. In one or more embodiments, the resin composition can include less than 3 wt %, less than 2 wt %, less than 1 wt %, less than 0.7 wt %, less than 0.5 wt %, less than 0.3 wt %, or less than 0.1 wt % of any polysaccharide, based on the total weight of the resin composition. In one or more embodiments, a combined amount of any disaccharide, any oligosaccharide, and any polysaccharide can be less than 3 wt %, less than 2 wt %, less than 1 wt %, less than 0.7 wt %, less than 0.5 wt %, less than 0.3 wt %, or less than 0.1 wt %, based on the total weight of the resin composition. In one or more embodiments, the resin composition can be free of any intentionally added disaccharide, any oligosaccharide, and/or any polysaccharide. In one or more embodiments, the resin composition can be free of any disaccharide, any disaccharide, and/or any oligosaccharide. In one or more embodiments, the resin composition can be free of at least two of: a disaccharide, an oligosaccharide, and a polysaccharide. In one or more embodiments, the resin composition can be free of any disaccharide, any oligosaccharide, and any polysaccharide.

The viscosity of the resin composition can be adjusted by adding one or more liquid mediums thereto. The liquid medium can increase the resin composition's storage or "shelf" life and/or provide a resin composition having a viscosity suitable for continuous, high-speed laminating processes. The liquid medium can be or include one or more polar aprotic solvents, one or more polar protic solvents, or any mixture thereof. Illustrative polar aprotic solvents can include, but are not limited to, tetrahydrofuran ("THF"), dimethyl sulfoxide ("DMSO"), N-methylpyrrolidone ("NMP"), dimethyl acetamide, acetone, or any mixture thereof. Illustrative polar protic solvents can include, but are not limited to, water, methanol, ethanol, propanol, butanol, or any mixture thereof. Other liquid mediums can include ketones such as methyl ethyl ketone.

The viscosity of the resin composition can widely vary. For example, the viscosity of the resin composition can be about 1 cP, about 50 cP, or about 75 cP, to about 200 cP, about 400 cP, or about 1,000 cP, at a temperature of about 25° C. In another example, the resin composition can have a viscosity of about 1 cP to about 125 cP, about 50 cP to about 110 cP, about 75 cP to about 125 cP, about 65 cP to about 95 cP, about 90 cP to about 260 cP, about 100 cP to about 200 cP, about 110 cP to about 160 cP, about 120 cP to about 400 cP, about 75 cP to about 350, about 300 cP to about 1,000 cP, about 500 cP to about 1,000 cP, about 30 cP to about 500 cP, about 60 cP to about 300 cP, or about 50 cP to about 400 cP, at a temperature of about 25° C. In another example, the resin composition can have a viscosity of about 1 cP to about 45 cP, about 45 cP to about 125, about 125 cP to about 550 cP, about 550 cP to about 825 cP, about 825 cP to about 1,000 cP, or about 700 cP to about 990 cP, at a temperature of about 25° C. In another example, the viscosity can at least 20 cP, at least 40 cP, at least 60 cP, at least 80 cP, at least 100 cP, at least 120 cP, at least 140 cP, at least 160 cP, at least 180 cP, or at least 200 cP and less than 500 cP, less than 475 cP, less than 450 cP, than 425 cP, less than 400 cP, less than 375 cP, less than 350 cP, less than 325 cP, less than 300 cP, less than 275 cP, less than 250 cP, less than 225 cP, or less than 200 cP, at a temperature of about 25° C. The viscosity can be determined using a Brookfield viscometer, e.g., model DV-II+. For example, the Brookfield viscometer can be equipped with a small sample adapter such a 10 mL adapter and the appropriate spindle to maximize torque such as a spindle no. 31.

In at least one embodiment, the resin composition can include water. For example, the resin composition can have a water concentration of about 0.1 wt %, about 1 wt %, about 5 wt %, about 10 wt %, about 15 wt %, or about 20 wt % to about 50 wt %, about 60 wt %, or about 70 wt % water, based on the combined weight of the monosaccharide, the phenolic resin, and the water. In another example, the resin composition can include about 0.1 wt % to about 5 wt %, about 2 wt % to about 7 wt %, about 5 wt % to about 15 wt %, about 8 wt % to about 25 wt %, about 12 wt % to about 23 wt %, about 15 wt % to about 30 wt %, about 15 wt % to about 25 wt %, about 18 wt % to about 29 wt %, about 25 wt % to about 35 wt %, about 30 wt % to about 43 wt %, about 35 wt % to about 55 wt %, about 45 wt % to about 52 wt %, or about 55 wt % to about 70 wt %, based on the combined weight of the monosaccharide, the phenolic resin, and the water.

The resin composition can have a total solids concentration from a low of about 10 wt %, about 20 wt %, about 40 wt %, about 50 wt %, or about 65 wt % to a high of about 75 wt %, about 80 wt %, about 85 wt %, about 90 wt %, or about 95 wt %, based on the total weight of the resin composition. In another example, the resin composition can have a total solids concentration of about 20 wt % to about 50 wt %, about 35 wt % to about 60 wt %, about 45 wt % to about 85 wt %, or about 60 wt % to about 90 wt %, based on the total weight of the resin composition. As used herein, the solids content, as understood by those skilled in the art, can be measured by determining the weight loss upon heating a small sample (e.g., about 1 gram to about 5 grams) of the reaction mixture, to a suitable temperature, e.g., 125° C., and a time sufficient to remove the liquid therefrom.

Pot life denotes the period during which the resin composition, in whatever stage, is suitable for use in a production process that can include impregnation, manipulation, hardening, and curing steps. Examples of such processes include processes that saturate a substrate with the resin composition. After the impregnation, the resin can be partially hardened or cured to form a B-staged or "post-formable" composite product. Some applications require adequate "shelf life" of the B-staged or post-formable composite product. A shelf-stable post-formable composite product can maintain the impregnated resin composition in the substrate at the B-stage. The shelf life is the period during which the resin remains in the B-stage. Thus, it can be desirable that the resin advance to B-stage quickly and have adequate shelf life at the B-stage. Then, when the resin is further advanced, it can harden and cure quickly to form a composite product or "post-formed" composite product.

In one or more embodiments, one or more additives or additional materials can be added to the resin composition. The additives can be added to the resin composition at any time. For example, the additives can be added to the resin composition before or after the phenolic resin has been made, or before or after the monosaccharide has been added to the resin composition. Illustrative additives can include, but are not limited to, waxes or other hydrophobic additives, aqueous polymer dispersions, lubricants, plasticizers, filler material, extenders, surfactants, release agents, dyes, fire retardants, biocides, or any mixture thereof.

Suitable extenders can include, but are not limited to, one or more starches and/or one or more polysaccharides. An extender can be or include ECOSHPERE®, made by Ecosynthetix, Inc. An illustrative plasticizer can include an aqueous polymer dispersion or a thermoplastic latex. Suitable aqueous polymer dispersion can include acrylate, methacrylate, vinyl acetate homopolymers, styrene/acrylate polymer, styrene/methacrylate polymer, polybutadiene/styrene polymers, or any mixture thereof. The plasticizer can increase the flexibility of the resin composition-saturated cellulosic sheets of a composite product made therefrom.

The addition of a surfactant to the resin composition can improve the penetration ability or penetration characteristics of the resin composition. Resin penetration can be achieved without increasing the relative amount of organic solvent in the resin composition. The ability to achieve a balanced ratio of water to organic solvent can be important because a higher organic solvent content can detrimentally lower the flash point of the resin composition while a higher water content (which raises the flash point) can detrimentally affect the penetration rate of the resin composition into cellulosic sheets. By including formamide or an equivalent with the resin, a reduction in the amount of organic solvent relative to water can be achieved while maintaining the resin's penetration characteristics. Illustrative surfactants can include, but are not limited to, formamide, N-methyl formamide, N,N-dimethyl formamide, N-ethyl formamide, N,N-diethyl formamide, N,N-diphenyl formamide, N-methyl formanilide, polyglycols, diethylene glycol, tridethylene glycol. Illustrative surfactants can also include commercial products such as FC-615 made by 3M and SURFYNOL® made by Air Products and Chemicals, Inc.

If the resin composition includes one or more additional additives, the amount of each additive can be from a low of about 0.001 wt %, about 0.01 wt %, about 0.1 wt %, about 1 wt %, or about 5 wt % to a high of 20 wt %, about 30 wt %, about 40 wt %, or about 50 wt %, based on the total weight of the phenolic resin, monosaccharide, and the additive. For example, if the resin composition includes one or more additional additives, the amount of each additive can about 0.01 wt % to about 5 wt %, about 1 wt % to about 10 wt %, about 5 wt % to about 40 wt %, about 0.01 wt % to about 50 wt %, about 2 w % to about 20 wt %, about 15 wt % to about 45 wt %, or about 1 wt % to about 15 wt %, based on the total weight of the phenolic resin, the monosaccharide, and the additive.

The phenolic resin can be produced via any suitable process. One or more phenolic compounds, one or more aldehyde compounds, and, optionally, one or more catalysts can be directed, charged, or otherwise introduced to a reaction vessel to provide a reaction mixture therein. The reaction mixture can be agitated. For example, if a solvent is also present in the reaction vessel, the reaction mixture can be agitated to improve and/or maintain a homogeneous or substantially homogenous distribution of the reactants in the solvent or a homogeneous or substantially homogenous distribution of the solvent in the reaction mixture. In one or more embodiments, the reaction mixture is not agitated. The components of the reaction mixture can be combined within one or more mixers. The mixer can be or include any device, system, or combination of device(s) and/or system(s) capable of batch, intermittent, and/or continuous mixing, blending, contacting, or the otherwise combining of two or more components. Illustrative mixers can include, but are not limited to, mechanical mixer agitation, ejectors, static mixers, mechanical/power mixers, shear mixers, sonic mixers, vibration mixing, e.g., movement of the mixer itself, or any mixture thereof. The mixer can include one or more heating jackets, heating coils, internal heating elements, cooling jackets, cooling coils, internal cooling elements, or the like, to regulate the temperature therein. The mixer can be an open vessel or a closed vessel. The components of the reaction mixture can be combined within the mixer under a vacuum, at atmospheric pressure, or at pressures greater than atmospheric pressure.

The phenolic resin can have a molar ratio of the aldehyde component(s) or compound(s) to phenolic component(s) or compounds of about 0.5:1, about 0.7:1, about 1:1, about 1.1:1, about 1.3:1, about 1.5:1, about 1.7:1, about 2:1, or about 2.1:1 to about 3:1, about 3.3:1, about 3.5:1, about 3.7:1, about 4:1, about 4.3:1, about 4.5:1, about 4.7:1, or about 5:1. For example, the molar ratio of the aldehyde compound to the phenolic compound in the phenolic resin can be about 0.5:1 to about 1.2:1, about 1.01:1 to about 4:1, about 1.2:1 to about 1.4:1, about 1.4:1 to about 2.5:1, about 1.5:1 to about 2:1, about 1.7:1 to about 1.9:1, about 1.6:1 to about 2:1, about 1.8:1 to about 2.2:1, about 1.4:1 to about 1.7:1, about 2:1 to about 3:1, about 2.2:1 to about 3.5:1, about 3:1 to about 4:1, or about 4:1 to about 5:1. In another example, the molar ratio of the aldehyde compound to the phenolic compound can be at least 1:1, at least 1.01:1, at least 1.05:1, at least 1.1:1, at least 1.2:1, at least 1.3:1, at least 1.4:1, at least 1.5:1, at least 1.6:1, at least 1.65:1, or at least 1.7:1 and up to about 2:1, about 3:1, about 3.5:1, about 4:1, about 4.5:1, or about 5:1.

The one or more catalysts, if present, can include, but is not limited to, one or more bases and/or one or more acids. Illustrative bases can include, but are not limited to, alkali metal and alkali earth hydroxides, alkali metal and alkali earth carbonates, amines, or any mixture thereof. Illustrative alkali metal hydroxides can include, but are not limited to, lithium hydroxide, sodium hydroxide, potassium hydroxide, or any mixture thereof. Illustrative alkali earth metal hydroxides can include, but are not limited to, calcium hydroxide and magnesium hydroxide. Illustrative alkali metal carbonates can include, but are not limited to, sodium carbonate and potassium carbonate. Illustrative amines can include, but are not limited to, triethylenetetramine and GP® 4590 k-20 precatalyst, available from Georgia-Pacific Chemicals LLC. Illustrative acids can include, but are not limited to, sulfuric acid, maleic acid, glacial acetic acid, formic acid, urea-phenolsulfonic acid solution, or any mixture thereof.

The reaction mixture can have a catalyst concentration from a low of about 0.2 wt % about 1 wt %, or about 2 wt %, to a high of about 7 wt %, about 12 wt %, or about 20 wt %, based on the combined weight of the phenol, formaldehyde, and catalyst. For example, the reaction mixture can have a catalyst concentration of about 0.2 wt % to about 1 wt %, about 1 wt % to about 5 wt %, about 5 wt % to about 10 wt %, about 8 wt % to about 15 wt %, about 12 wt % to about 20 wt %, based on the combined weight of the phenol, formaldehyde, and catalyst. In another example, at least about 0.005 mol of catalyst per mol of phenol component can be used. In another example, the reaction mixture can have concentration of catalyst of about 0.01 mol to about 1 mol per mol of phenol component. The catalyst can be added initially to the reaction mixture at once or the catalyst can be added incrementally in two or more additions or continuously over time.

The phenolic component and the aldehyde component can first be pre-polymerized, e.g., reacted to form a prepolymer. For example, the phenolic compound and the aldehyde compound can be pre-polymerized at a temperature of about 20° C., about 25° C., about 30° C., about 35° C., or about 40° C. to about 50° C., about 55° C., about 60° C., about 65° C., about 70° C., about 75° C., about 80° C., about 85° C., about 90° C., about 95° C., or about 100° C. In another example, the phenolic compound and the aldehyde compound can be pre-polymerized at a temperature of about 30° C. to about 95° C., about 60° C. to about 90° C., about 75° C. to about 95° C., or about 50° C. to about 100° C. In another example, the phenolic compound and the aldehyde compound can be pre-polymerized at a temperature of about 40° C., about 50° C., about 60° C., about 70° C., about 75° C., a bout 80° C., about 85° C., about 90° C., or about 95° C. The prepolymer can be mixed, blended, stirred, or otherwise combined with additional phenol and formaldehyde. As used herein, the term prepolymer refers to the reaction product formed by reacting at least the phenolic compound and the aldehyde compound with one another so long as the resulting product remains in liquid form at room temperature (e.g., about 25° C.).

A cyclic urea prepolymer can also be used as the prepolymer for the phenolic resin. The cyclic urea prepolymer can formed by a reaction of urea, formaldehyde, and ammonia or a primary amine. The cyclic urea prepolymer can be prepared by any suitable method. For example, urea, formaldehyde, and ammonia or primary amine can be mixed and heated to the desired temperature for a set period of time to form the cyclic urea prepolymer. In one example, the molar ratio of reactants for the cyclic urea prepolymer can be about 0.1 to about 3 moles formaldehyde to about 0.1 to about 3 moles ammonia or primary amine to about 0.1 to about 1 moles of urea. In another example, the molar ratio of reactants for the cyclic urea prepolymer can be about 0.1 moles to about 3 moles formaldehyde, about 0.1 moles to about 1 mole ammonia or primary amine, and about 0.1 mole to about 1 mole urea.

Processes of making cyclic urea prepolymers are recognized in the art. In one embodiment, the cyclic urea prepolymer can be prepared by charging a reaction vessel with formaldehyde, ammonia, and urea while maintaining the temperature below about 70° C. The order of addition is not critical, but it is important to take care during the addition of ammonia to formaldehyde (or formaldehyde to ammonia), due to the exothermic reaction. In fact, due to the strong exotherm, it can be preferred to charge the formaldehyde and the urea first, followed by the ammonia. This sequence of addition allows one to take advantage of the endotherm caused by the addition of urea to water to increase the rate of ammonia addition. A base can be added, if needed, to maintain an alkaline reaction condition throughout the synthesis.

Once all the reactants are in the reaction vessel, the resulting solution can be heated at an alkaline pH to a temperature of about 60° C. to about 105° C. For example, the reaction solution or reaction mixture can be heated at a pH of about 7.5 to 12 to a temperature of about 85° C. to about 95° C. for about 30 minutes to about 3 hours, depending, at least in part, on mole ratio and temperature, or until the reaction is complete. Once the reaction is complete, the solution can be cooled to room temperature (e.g., about 25° C.) for storage. The resulting solution can be storage stable for several months at ambient conditions. The resulting solution can have a pH of about 5 to about 11.

In addition, the cyclic urea prepolymer can be prepared by the methods discussed and described in U.S. Pat. No. 5,674,971. For example, the cyclic urea prepolymer can be prepared by reacting urea and formaldehyde in at least a two-step and optionally a three-step process. In the first step, conducted under alkaline reaction conditions, urea and formaldehyde can be reacted in the presence of ammonia, at a formaldehyde to urea molar ratio of about 1.2:1 to about 1.8:1. The ammonia can be added in an amount sufficient to provide an ammonia/urea molar ratio of about 0.05:1 to about 1.2:1. The mixture can be reacted to form a cyclic triazone/triazine or cyclic urea prepolymer which can form the building block for the ultimate resin. Thereafter, a thermosetting resin can be formed from the cyclic triazole/triazine resin building block by adding additional formaldehyde to provide a higher cumulative formaldehyde to urea molar ratio of about 1.5:1 to about 3:1. The pH can be adjusted low enough to control the rate of condensation and the reaction can be continued under mildly acidic condition (second step). During this reaction, the pH can be lowered to about 4.3 to about 4.9 and the resin viscosity can advance. Once the desired viscosity endpoint is reached, the reaction mixture can be cooled and the resin can be used or the resin can be neutralized (third step) with, for example, sodium hydroxide, to enhance the storage stability of the resin for later use and/or distribution.

Water soluble triazone compounds can also be prepared by reacting urea, formaldehyde, and a primary amine as discussed and described in U.S. Pat. Nos. 2,641,584 and 4,778,510, which also describe suitable primary amines that can include, but are not limited to, alkyl amines such as methyl amine, ethyl amine, and propyl amine, lower hydroxyamines such as ethanolamine cycloalkylmonoamines such as cyclopentylamine, ethylenediamine, hexamethylenediamine, and linear polyamines. The primary amine can be substituted or unsubstituted.

The cyclic prepolymer can be reacted into the phenolic resin and/or added as a post phenolic resin synthesis component. For example, the cyclic urea prepolymer can be blended with the prepared phenolic resin to produce the resin composition.

The cyclic urea prepolymer can be reacted with the aldehyde component before reacting the material with the phenolic component to tie the cyclic urea prepolymer into the overall polymer structure. For example, the cyclic urea prepolymer can be reacted with formaldehyde (e.g., 50 wt % aqueous formaldehyde solution) at a molar ratio of about 4:1, or about 2:1, by adding the two together in a suitable container, adjusting the pH to about 8.5 to 10, e.g., about 9.0 to 9.5, and heating to about 80° C. to about 100° C. The mixture can be reacted under these conditions for about two hours to produce an intermediate product. The intermediate product can be added to the front of the phenolic resin synthesis process. The reaction with the phenolic component can be achieved by adding the pre-methylolated cyclic urea prepolymer to all the phenolic component normally used to make the base resin and adding NaOH (e.g., a 50 wt % aqueous solution) to bring the pH to about 9.5 to 11.5. The mixture can be heated to about 80° C. to about 100° C., for about one hour or longer depending, at least in part, on the pH.

The extent or amount the compounds react to form the prepolymer can be based on one or more properties. Illustrative properties of the reaction product or prepolymer that can be used to monitor the extent of reaction can include, but are not limited to, viscosity, water concentration, refractive index, the unreacted or free concentration of the aldehyde component, molecular weight, or any mixture thereof.

The prepolymer, e.g., the phenolic-aldehyde prepolymer and/or the cyclic urea prepolymer can be reacted to an endpoint based on the molecular weight of the prepolymer. For example, the prepolymer can be polymerized until the prepolymer has a weight average molecular weight of about 200, about 300, about 400, or about 800 to about 900, or about 1,000. In another example, the prepolymer can be polymerized until the prepolymer has a weight average molecular weight of about 200 to about 300, about 300 to about 450, about 400 to about 600, about 550 to about 800, about 650 to about 900, or about 900 to about 1,000. As known by those skilled in art, the molecular weight can be determined using Gel Permeation Chromatography (GPC). A suitable GPC method can use an aqueous mobile phase, which can also serve as a solvent/diluent for the resin samples. Separation can be achieved with an Agilent PL aquagel-OH MIXED-H column calibrated with, for example, polyethylene glycols (PEGs) and polyethylene oxides (PEOs). A particular resin sample can be diluted and can be injected into a GPC system or an equivalent system, available from Waters Corporation. The data collected from the GPC system can be used to determine the weight average molecular weight from the calibration curve used in the normal manner with integration of the distribution curve. The method of determining the molecular weight of the resin samples is well understood by those skilled in the art and other configurations and reference materials can conveniently be used.

If the prepolymer is formed, the prepolymer can be polymerized until the prepolymer has a viscosity from a low of about 0.5 cP, about 1 cP, about 2 cP, about 10 cP, or about 50 cP to a high of about 100 cP, about 500 cP, about 1,000 cP, about 2,500 cP, about 5,000 cP, or about 10,000 cP at temperature of 25° C. For example, the phenol component and the aldehyde component can be reacted with one another until the prepolymer has a viscosity of about 1 cP to about 800 cP, about 5 cP to about 500 cP, about 75 cP to about 400 cP, about 125 cP to about 1,100 cP, or about 150 cP to about 300 cP at a temperature of 25° C.

If the prepolymer is formed, the prepolymer can be polymerized until the prepolymer has a water concentration of about 0.5 wt %, about 1 wt %, about 2 wt %, or about 3 wt % to about 50 wt %, about 60 wt %, about 70 wt %, or about 80 wt %, based on the weight of the prepolymer, any unreacted phenolic component, any unreacted aldehyde component, and water. For example, the prepolymer can be polymerized until the prepolymer has a water concentration of about 5 wt % to about 50 wt %, about 1 wt % to about 25 wt %, about 10 wt % to about 40 wt %, about 12 wt % to about 20 wt %, or about 15 wt % to about 35 wt %, based on the weight of the prepolymer, any unreacted phenolic component, any unreacted aldehyde component, and water.

If the prepolymer is formed, the prepolymer can be polymerized until a desired refractive index is achieved. For example, the prepolymer can be polymerized until the prepolymer has a refractive index of about 1.1000, about 1.2000, about 1.3000, or about 1.3200 to about 1.4500, about 1.4800, about 1.5000, about 1.5500, about 1.6000, about 1.6500, about 1.7000, about 1.7500, or about 1.8000. In another example, the prepolymer can be polymerized until the prepolymer has a refractive index from 1.3500 to about 1.4500, about 1.3800 to about 1.4400, about 1.3900 to about 1.4350, about 1.3900 to about 1.4500, about 1.1000 to about 1.7000, about 1.3000 to about 1.6000, about 1.4200 to about 1.5500, about 1.4800 to about 1.6400, or about 1.3700 to about 1.4300. The refractive index can be measured with a Bellingham+Stanley Ltd RFM 330 refractometer according to well known methods.

The phenolic component and the aldehyde component, and, if present, the prepolymer, can be reacted to produce the phenolic resin. The polymerization of the phenolic component and the aldehyde component, and, if present, the prepolymer, can be reacted until the phenolic resin exhibits one or more desired properties. A suitable endpoint for the polymerization reaction can be based on one or more properties. Illustrative properties of the phenolic resin that can be used to monitor the extent of reaction can include, but are not limited to, viscosity, water concentration, refractive index, the unreacted or free concentration of the formaldehyde component, molecular weight, or any mixture thereof. The phenolic resin can then be cooled under vacuum and distilled to remove at least a portion of any water present.

The polymerization of the phenolic component and the aldehyde component, and, if present, the prepolymer, can be carried out for a time of about 1 minute, about 10 minutes, or about 30 minutes to about 8 hours, about 10 hours, or about 20 hours. For example, if the prepolymer is formed, the phenolic component and the aldehyde component can be reacted with one another until the prepolymer has a viscosity from of about 0.5 cP, about 1 cP, about 2 cP, about 10 cP, or about 50 cP to about 100 cP, about 500 cP, about 1,000 cP, about 2,500 cP, about 5,000 cP, or about 10,000 cP at temperature of 25° C. In another example, the phenolic component and aldehyde component can be reacted with one another until the prepolymer has a viscosity of about 1 cP to about 800 cP, about 5 cP to about 500 cP, about 75 cP to about 400 cP, about 125 cP to about 1,100 cP, or about 150 cP to about 300 cP at a temperature of 25° C. The viscosity of the reaction mixture or prepolymer or other liquids can be determined using a Brookfield Viscometer at a temperature of 25° C.

The polymerization of the phenolic component and the aldehyde component, and, if present, the prepolymer, can be reacted with one another until the phenolic resin has a water concentration of about 0.5 wt %, about 1 wt %, about 2 wt %, or about 3 wt % to about 50 wt %, about 60 wt %, about 70 wt %, or about 80 wt %, based on the weight of the prepolymer, the phenolic component, the aldehyde component, phenolic resin, and the water. For example polymerization of the phenolic component and the aldehyde component, and, if present, the prepolymer, can be reacted with one another until the phenolic resin has a water concentration of about 5 wt % to about 50 wt %, about 1 wt % to about 25 wt %, about 10 wt % to about 40 wt %, about 12 wt % to about 20 wt %, or about 15 wt % to about 35 wt %, based on the weight of the prepolymer, the phenolic component, the aldehyde component, phenolic resin, and the water.

The polymerization of the phenolic component and the aldehyde component, and, if present, the prepolymer, can be reacted with one another until the phenolic resin has a refractive index of about 1.1000, about 1.2000, about 1.3000, or about 1.3200 to about 1.4500, about 1.4800, about 1.5000, about 1.5500, about 1.6000, about 1.6500, about 1.7000, about 1.7500, or about 1.8000. For example, the polymerization of the phenolic component and the aldehyde component, and, if present, the prepolymer, can be reacted with one another until the phenolic resin has a refractive index of about 1.3500 to about 1.4500, about 1.3800 to about 1.4400, about 1.3900 to about 1.4350, about 1.3900 to about 1.4500, about 1.1000 to about 1.7000, about 1.3000 to about 1.6000, about 1.4200 to about 1.5500, about 1.4800 to about 1.6400, or about 1.3700 to about 1.4300.

The phenolic component can include one or more phenolic compounds. The one or more phenolic compounds can be or include phenol, one or more substituted phenol compounds, one or more unsubstituted phenol compounds, or any combination or mixture of substituted and/or unsubstituted phenol compounds. For example, the phenolic component can be or include phenol itself (monohydroxybenzene). Illustrative substituted phenolic compounds can include, but are not limited to, alkyl-substituted phenols such as the cresols and xylenols; cycloalkyl-substituted phenols such as cyclohexyl phenol; alkenyl-substituted phenols; aryl-substituted phenols such as p-phenyl phenol; alkoxy-substituted phenols such as 3,5-dimethyoxyphenol; aryloxy phenols such as p-phenoxy phenol; and halogen-substituted phenols such as p-chlorophenol. Dihydric phenols such as catechol, resorcinol, hydroquinone, bisphenol A and bisphenol F also can also be used. For example, the phenol compounds can be or include, but is not limited to, resorcinol, phenol, catechol, hydroquinone, pyrogallol, 5-methylresorcinol, 5-ethylresorcinol, 5-propylresorcinol, 4-methylresorcinol, 4-ethylresorcinol, 4-propylresorcinol, resorcinol monobenzoate, resorcinol monosinate, resorcinol diphenyl ether, resorcinol monomethyl ether, resorcinol monoacetate, resorcinol dimethyl ether, phloroglucinol, benzoylresorcinol, resorcinol rosinate, alkyl substituted resorcinol, aralkyl substituted resorcinol, 2-methylresorcinol, phloroglucinol, 1,2,4-benzenetriol, 3,5-dihydroxybenzaldehyde, 2,4-dihydroxybenzaldehyde, 4-ethylresorcinol, 2,5-dimethylresorcinol, 5-methylbenzene-1,2,3-triol, 3,5-dihydroxybenzyl alcohol, 2,4,6-trihydroxytoluene, 4-chlororesorcinol, 2',6'-dihydroxyacetophenone, 2',4'-dihydroxyacetophenone, 3',5'-dihydroxyacetophenone, 2,4,5-trihydroxybenzaldehyde, 2,3,4-trihydroxybenzaldehyde, 2,4, 6-trihydroxybenzaldehyde, 3,5-dihydroxybenzoic acid, 2,4-dihydroxybenzoic acid, 2,6-dihydroxybenzoic acid, 1,3-dihydroxynaphthalene, 2',4'-dihydroxypropiophenone, 2',4'-dihydroxy-6'-methylacetophenone, 1-(2,6-dihydroxy-3-methylphenyl)ethanone, 3-methyl 3,5-dihydroxybenzoate, methyl 2,4-dihydroxybenzoate, gallacetophenone, 2,4-dihydroxy-3-methylbenzoic acid, 2,6-dihydroxy-4-methylbenzoic acid, methyl 2,6-dihydroxybenzoate, 2-methyl-4-nitroresorcinol, 2,4,5-trihydroxybenzoic acid, 3,4,5-trihydroxybenzoic acid, 2,3,4-trihydroxybenzoic acid, 2,4,6-trihydroxybenzoic acid, 2-nitrophloroglucinol, or any mixture thereof. The phenol component can include any combination of two or more phenol components combined with one another and/or added independent of one another to the reaction mixture.

The aldehyde component can include one or more aldehyde compounds. The aldehyde compound can be or include one or more substituted aldehyde compounds, one or more unsubstituted aldehyde compounds, or any mixture of substituted and/or unsubstituted aldehyde compounds. Suitable aldehyde compounds can include, but are not limited to, aldehydes having the chemical formula RCHO, where R is hydrogen or a hydrocarbyl group. Illustrative hydrocarbyl groups can include 1 carbon atom to about 8 carbon atoms. Suitable aldehyde compounds can also include the so-called masked aldehydes or aldehyde equivalents, such as acetals or hemiacetals. Illustrative aldehyde compounds can include, but are not limited to, formaldehyde, paraformaldehyde, acetaldehyde, propionaldehyde, butyraldehyde, furfuraldehyde, benzaldehyde, or any mixture thereof. Still other suitable formaldehyde compounds can include formaldehyde present in a prepolymer or precondensate such as urea-formaldehyde precondensate (UFC).

The aldehyde compound can also be or include, but is not limited to, one or more multifunctional aldehyde compounds. As used herein, the terms "multifunctional aldehyde compound" and "multifunctional aldehyde" are used interchangeably and refer to compounds having at least two functional groups, with at least one of the functional groups being an aldehyde group. For example, the multifunctional aldehyde can include two or more aldehyde functional groups. In another example, the multifunctional aldehyde can include at least one aldehyde functional group and at least one functional group other than an aldehyde functional group. As used herein, the term "functional group" refers to reactive groups in the multifunctional aldehyde compound and can include, but is not limited to, aldehyde groups, carboxylic acid groups, ester groups, amide groups, imine groups, epoxide groups, aziridine groups, azetidinium groups, and hydroxyl groups.

The multifunctional aldehyde compound can include two or more carbon atoms and have two or more aldehyde functional groups. For example, the multifunctional aldehyde compound can include two, three, four, five, six, or more carbon atoms and have two or more aldehyde functional groups. The multifunctional aldehyde compound can include two or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group. For example, the multifunctional aldehyde compound can include two, three, four, five, six, or more carbon atoms and have at least one aldehyde functional group and at least one functional group other than an aldehyde group such as a carboxylic acid group, an ester group, an amide group, an imine groups, an epoxide group, an aziridine group, an azetidinium group, and/or a hydroxyl group.

Suitable bifunctional or difunctional aldehyde compounds that include three or more carbon atoms and have two aldehyde functional groups (—CHO) can be represented by the following chemical formula:

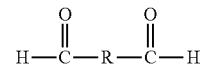

where R can be a divalent aliphatic, cycloaliphatic, aromatic, or heterocyclic group having 1 carbon atom to 12 carbon atoms. Illustrative multi-functional aldehydes can include, but are not limited to, malondialdehyde, succindialdehyde, glutaraldehyde, 2-hydroxyglutaraldehyde, β-methylglutaraldehyde, adipaldehyde, pimelaldehyde, suberaldehyde, malealdehyde, fumaraldehyde, sebacaldehyde, phthalaldehyde, isophthalaldehyde, terephthalaldehyde, ring-substituted aromatic aldehydes, or any combination or mixture thereof. A suitable bifunctional or difunctional aldehyde that includes two carbon atoms and has two aldehyde functional groups is glyoxal.

Illustrative multifunctional aldehyde compounds that include an aldehyde group and a functional group other than an aldehyde group can include, but are not limited to, glyoxylic acid, glyoxylic acid esters, glyoxylic acid amides, 5-(hydroxymethyl)furfural, or any combination or mixture thereof. The aldehyde group in the multifunctional aldehyde compound can exist in other forms, e.g., as a hydrate. As such, any form or derivative of a particular multifunctional aldehyde compound can be used to prepare the resin compositions discussed and described herein. For example, in the context of glyoxylic acid, glyoxylic acid, glyoxylic acid monohydrate, and/or glyoxylate can be used to produce the phenolic resin.

If the aldehyde component is formaldehyde, a formaldehyde scavenger can be used to reduce the amount of free formaldehyde in the resin. Illustrative formaldehyde scavengers can include, but are not limited to, urea, amines, ammonia, and alkanolamines.

One or more additions of urea can be added to the phenolic resin to reduce the free formaldehyde content and advantageously impact resin curing. Any form of urea, e.g., solid urea, such as prill, and urea solutions, such as aqueous solutions, can be used. The urea can be added in an amount of about 0.1 wt %, about 0.5 wt %, about 1 wt %, or about 2 wt % to about 5 wt %, about 7 wt %, about 10 wt %, or about 15 wt %, based on the total weight of the phenolic resin. In other example, the urea can be added to the phenolic resin in an amount of about 0.1 wt % to about 1 wt %, about 0.5 wt % to about 9 wt %, about 1 wt % to about 2 wt %, about 2 wt % to about 5 wt %, about 3 wt % to about 12 wt %, about 5 wt % to about 10 wt %, about 7 wt % to about 15 wt %, about 10 wt % to about 15 wt %, about 12 wt % to about 18 wt %, or about 15 wt % to about 20 wt %, based on the total weight of the phenolic resin. The urea can be added to phenolic resin at room temperature (e.g., about 25° C.) or at an elevated temperature, e.g., about 30° C. to about 60° C.

If the aldehyde component is formaldehyde, the phenolic resin can have an amount of free formaldehyde of about 0.001 wt % and about 6 wt %. For example, the phenolic resin can have a concentration of free formaldehyde of about 0.03 wt % to about 0.13 wt %, about 0.1 wt %, about 0.5 wt %, about 1 wt %, or about 2 wt % to about 3 wt %, about 5 wt %, or about 6 wt %, based on the total weight of the phenolic resin. In another example, the phenolic resin can have a concentration of free formaldehyde of less than 3 wt %, less than 2 wt %, less than 1 wt %, less than 0.5 wt %, less than 0.3 wt %, less than 0.2 wt %, less than 0.15 wt %, or less than 0.1 wt %.

The phenolic resin can have a concentration of free phenol of about 0.1 wt %, about 0.5 wt %, about 1 wt %, or about 2 wt % to about 5 wt %, about 10 wt %, or about 15 wt %, based on the total weight of the phenolic resin. The phenol-formaldehyde resin can have an amount of free phenol of about 0.1 wt % and about 6 wt %, about 2 wt % and about 8 wt %, about 5 wt % and about 12 wt %, or about 7 wt % and about 15 wt %, based on the total weight of the phenolic resin.

The phenolic resin can have a weight average molecular weight ($M_w$) of about 200, about 300, or about 400 to about 900, about 1,500, or about 2,000. In another example, the phenolic resin can have a weight average molecular weight of about 200 to about 450, about 250 to about 650, about 350 to about 550, about 500 to about 850, about 850 to about 1,000, about 900 to about 1,500, or about 1,400 to about 2,000. In another example, the phenolic resin can have a weight average molecular weight of about 215 to about 600, about 400 to about 800, about 600 to about 900, about 800 to about 1,550, or about 1,425 to about 1,875. In another example, the phenolic resin can have a weight average molecular weight of about 200, about 225, about 250, about 275, or about 300 to 1,500 or less, 1,200 or less, 1,000 or less, 800 or less, 600 or less, 500 or less, 450 or less, 425 or less, 400 or less, 395 or less, 390 or less, 385 or less, 380 or less, 375 or less, 370 or less, 365 or less, 360 or less, 355 or less, or 350 or less.

The phenolic resin can have a number average molecular weight ($M_n$) of about 200, about 300, or about 400 to about 900, about 1,500, or about 2,000. In another example, the phenolic resin can have a number average molecular weight of about 200 to about 450, about 350 to about 550, about 450 to about 950, about 650 to about 950, about 900 to about 1,300, or about 1,300 to about 2,000. In another example, the phenolic resin can have a number average molecular weight of about 215 to about 600, about 600 to about 975, about 920 to about 1,400, about 1,230 to about 1,550, or about 1,425 to about 2,000.

The phenolic resin can have a z-average molecular weight ($M_z$) of about 200, about 300, or about 400 to about 900, about 1,500, or about 2,000. In another example, the phenolic resin can have a z-average molecular weight of about 200 to about 450, about 450 to about 650, about 500 to about 750, about 650 to about 1,000, about 1,200 to about 1,700, or about 1,500 to about 2,000. In another example, the phenolic resin can have a z-average molecular weight of about 275 to about 800, about 300 to about 530, about 500 to about 800, about 700 to about 1,250, about 1,425 to about 1,875, or about 1,475 to about 2,000. $M_w$, $M_n$, and $M_z$ can be measured using gel permeation chromatography (GPC), also known as size exclusion chromatography (SEC).

One illustrative process that can be modified to produce a phenolic resin that can be mixed with one or more monosaccharides can be similar to or the same as the process discussed and described in U.S. Pat. No. 6,706,845. Phenolic resins that can be used to make the resin composition can include, but are not limited to, phenol-formaldehyde resins, resorcinol formaldehyde resins, and phenol-resorcinol-formaldehyde resin, bisphenol A modified resin, bisphenyl F modified resin, and t-butyl phenol modified resin.

The phenolic resin can have a formaldehyde to phenol molar ratio of about 1.2 to about 2, which is equal to the moles of formaldehyde per one mole of phenol. For example, the formaldehyde to phenol molar ratio can be about 1.30 to about 1.85. The molar ratio of a formaldehyde scavenger to phenol can be about 0.02 to about 0.25. For example, the formaldehyde scavenger to phenol molar ratio can be about 0.05 to about 0.16. The phenolic resin can have a solids content in an amount of about 60 wt % to about 75 wt %. The phenolic resin can have a viscosity of about 100 cps to about 500 cps at 25° C. The phenolic resin can have a free phenol concentration of about 2 wt % to about 12 wt %. The phenolic resin can have a free formaldehyde concentration of less than 0.15 wt %. The phenolic resin can have a pH of about 7 to about 9.

The phenol and formaldehyde, in desired amounts, can be introduced into a suitable reaction vessel. One or more alkaline catalysts can also be introduced to the reaction vessel and the temperature of the reaction mixture can be increased to a temperature of about 70° C. to about 90° C., e.g., about 75° C. to about 85° C. The amount of the catalyst can be about 0.01 to about 0.1, about 0.03 to about 0.09, or about 0.04 to about 0.07, moles catalyst per mole of phenol.

Any suitable alkaline catalyst can be used. Illustrative catalysts can include, but are not limited to, the oxides and hydroxide of alkali metals and alkaline earth metals, tertiary amines, or any mixture thereof. For example, the catalyst can be or include, sodium hydroxide, lime, sodium carbonate, dimethylaminoethanol, potassium hydroxide, or any mixture thereof. The catalyst can be added as aqueous solutions.

The reaction can proceed for a time sufficient to produce a resin having a free formaldehyde content of less than about 0.5 wt %. Although one can determine the point in the resin preparation at which the free formaldehyde content has been reduced to less than 0.5 wt % by directly measuring the formaldehyde content of the resin, other indicia can be used to monitor the free formaldehyde content. For example, the viscosity, water dilutability, and/or free phenol content, can be correlated with free formaldehyde.

A formaldehyde scavenger can be added to the resin at a temperature above about 70° C. One or more scavengers can be added, and plural scavengers can be added simultaneously or serially, with intervening reaction periods. Illustrative scavengers can include, but are not limited to, melamine, ammeline, urea, dicyandiamide, benzoguanamine, and acetoguanamine.

The reaction mixture can be reacted at a temperature and for a time sufficient to produce the phenolic resin. The phenolic resin can be an A-stage resin. The phenolic resin can have a free formaldehyde concentration of less than about 0.15 wt % and a water dilutability of less than 4/1, less than 3.5/1, less than 3/1, less than 2.5/1, or less than 2/1. As such, the phenolic resin can be a resin that is not infinitely dilutable with water. For example, a phenolic resin having a water dilutability of less than 4/1 means that the addition of more than four parts of water to one part of resin will cause formation of haze.

A composite product can be made by contacting one or more substrates with the resin composition, and at least partially curing the resin composition to produce the composite product. As mentioned above, the resin composition can be cured via a number of methods, e.g., with the addition of one or more acids, bases, and/or catalysts, the application of heat, and/or pressure, or any combination thereof, to produce the composite product. The resulting product can be or include a single substrate or a laminate of two or more substrates.

The one or more substrates can be or include cellulosic sheets, cotton fabrics, e.g., paper sheets and/or kraft sheets. The one or more substrates can also be or include fibers, e.g., glass fibers. The cellulosic sheets can include cellulose fibers. Illustrative cellulose fibers can include, but are not limited to, substantially delignified cellulose fibers, including pulped fibers, "chemical pulps," "thermomechanical pulps," recycled pulp fiber, bleached and unbleached paper and paper-like materials, non-woven mats, sheets or felts, and the like. The origin of the delignified cellulose can be derived from any of a large variety of sources, including wood and various other plant fibers, such as from agricultural by-products, and also including recycled cellulose. Delignified celluloses are characterized as having had most to substantially all the indigenous lignin and analogous naturally-occurring binders removed. Preferably, a majority of the cellulosic material in the substrate, e.g., 90% or 95% or more, include fibers from the above group, although blends of fibers may be used.

The term "kraft paper" refers to paper produced by the kraft process. The kraft process includes treating wood chips with a mixture of sodium hydroxide and/or sodium sulfide to break the bonds between the lignin and the cellulose contained in the wood chips to form or produce a wood pulp. Most of the lignin, e.g., greater than 50 wt % of the lignin, in the wood chips can be separated from the cellulose to provide cellulose fibers that can then be formed into kraft paper. Such sheets can be manufactured in a number of basis-weight grades. For example, kraft paper can have a basis-weight of about 15 lb/1,000 ft$^2$ to about 260 lb/1,000 ft$^2$ or about 30 lb/1,000 ft$^2$ to about 200 lb/1,000 ft$^2$.

One or more acids, bases, heat, catalysts, and/or pressure can be added, mixed, blended, or otherwise combined with or transferred to the resin composition prior to, during, and/or after application of the resin composition to one or more cellulosic sheet or paper. The acid, base, heat, and/or pressure can initiate or start and/or accelerate the at least partial curing of the resin.

The amount of acid that can be added to the resin composition to initiate or start curing of the resin composition can be about 0.01 wt %, about 1 wt %, about 3 wt %, or about 5 wt % to about 30 wt %, about 40 wt %, about 45 wt %, or about 50 wt %, based on the combined weight of the resin composition and the acid. For example, the amount of acid that can be added to the resin composition to initiate or start curing of the resin can be about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the resin composition and the acid.

The amount of base that can be added to the resin composition to initiate or start curing of the resin composition can be about 0.01 wt %, about 1 wt %, about 3 wt %, or about 5 wt % to about 30 wt %, about 40 wt %, about 45 wt %, or about 50 wt %, based on the combined weight of the resin composition and the base. For example, the amount of base that can be added to the resin composition can be about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the resin composition and the base.

The amount of catalyst that can be added to the resin composition to initiate or start curing of the resin composition can be about 0.01 wt %, about 1 wt %, about 3 wt %, or about 5 wt % to about 30 wt %, about 40 wt %, about 45 wt %, or about 50 wt %, based on the combined weight of the resin composition and the catalyst. For example, the amount of catalyst that can be added to the resin composition to initiate or start curing of the resin can be about 0.1 wt % to about 15 wt %, about 10 wt % to about 25 wt %, about 5 wt % to about 35 wt %, about 25 wt % to about 40 wt %, or about 20 wt % to about 50 wt %, based on the combined weight of the resin composition and the catalyst.

Suitable acids that can be used to at least partially cure the resin composition can include, but are not limited to, one or more organic acids, one or more inorganic acids, or any mixture thereof. Illustrative inorganic acids can include, but are not limited to, sulfuric acid, ammonium sulfate, or any mixture thereof. Illustrative organic acids can include, but are not limited to, maleic acid, lactic acid, acetic acid, formic acid, a urea/phenolsulfonic acid, toluene sulfonic acid, or any mixture thereof.

Suitable bases that can be used to at least partially cure the resin composition can include, but are not limited to, organic bases, inorganic bases, or any mixture thereof. Illustrative inorganic bases can include, but are not limited to, sodium hydroxide, ammonium hydroxide, potassium hydroxide, triethylene tetraamine, diethylene triamine, triethylamine, urea, or any mixture thereof. Illustrative organic bases can include, but are not limited to, triethylamine, urea, GP® 4590 k-20 precatalyst, commercially available from Georgia-Pacific Chemicals LLC, or any mixture thereof.

Suitable catalysts that can be used to initiate or start curing of the resin can include, but are not limited to, one or more metal salts. Illustrative metal salts can include, but are not limited to, salts of sodium, potassium, aluminum, magnesium, zinc, or any mixture thereof. For example, the catalyst can be or include sodium nitrate, aluminum sulfate, ammonium hydrogen phosphate, ammonium persulfate, ammonium chloride, ammonium nitrate, ammonium sulfate, or any mixture thereof.

As used herein, the terms "curing," "cured," and similar terms are intended to refer to the structural and/or morphological change that occurs in the resin composition as it is cured to cause covalent chemical reaction (crosslinking), ionic interaction or clustering, improved adhesion to a substrate, phase transformation or inversion, and/or hydrogen bonding. As used herein, the phrases "at least partially cure," "at least partially cured," and similar terms are intended to refer to a resin composition that has undergone at least some covalent chemical reaction (crosslinking), ionic interaction or clustering, improved adhesion to the substrate, phase transformation or inversion, and/or hydrogen bonding, but may also be capable of undergoing additional covalent chemical reaction (crosslinking), ionic interaction or clustering, improved adhesion to the substrate, phase transformation or inversion, and/or hydrogen bonding.

In making the composite product, the substrate(s), e.g., paper sheet(s), can pass through a dip tank that includes a solution of the resin composition. The substrate can be at least partially saturated or "impregnated" with the resin composition during immersion in the tank. Excess resin composition can be removed from the substrate by opposed scraper bars or blades as the substrate leaves the dip tank. The substrates impregnated with resin composition can then be moved to a drying zone to evaporate volatile components, such as solvents, and/or increase the molecular weight of the resin(s). The substrates saturated with the resin composition resin can be laid up to a desired number of plies to provide stacked substrates or plies impregnated with the resin composition.

The stacked substrates or plies can be pressed to a pressure of about 3,000 kPa to about 15,000 kPa, e.g., about 5,500 kPa to about 10,500 kPa. The stacked substrates can be heated to a temperature of about −7° C., about 25° C. to about 50° C., about 35° C. to about 60° C., about 100° C. or about 120° C. to about 205° C., about 230° C., about 245° C., or about 260° C. In another example, the stacked substrates can be heated to a temperature of about −7° C. to about 38° C., about 38° C. to about 121° C., about 135° C. to about 220° C., about 121° C. to about 232° C., about 232° C. to about 260° C., about 30° C. to about 60° C., about 40° C. to about 200° C., about 100° C. to about 250° C., or about 120° C. to about 200° C. The stacked substrates can be pressed for a time from a low of about 3 seconds, about 10 minutes, or about 30 minutes or to a high of about 90 minutes, about 120, or about 150 minutes. In another example, the stacked substrates can be pressed for a time of about 3 seconds to about 60 seconds, about 10 seconds to about 150 seconds, about 30 seconds to about 3 minutes, about 45 seconds to about 5 minutes, about 1 minute to about 15 minutes, about 12 minutes to about 30 minutes, about 30 minutes to about 60 minutes, about 60 minutes to about 90 minutes, about 90 minutes to about 120 minutes, about 120 minutes to about 150 minutes, about 2 minutes to about 25 minutes, about 5 minutes to about 80 minutes, or about 40 minutes to about 110 minutes. While in the press, the resin composition can sufficiently flow to displace at least a portion of any air present between the substrates or plies and undergo at least partial curing to produce the composite product. After heating and/or pressing the heated and/or pressed substrates can be cooled. For example, the substrates, after heating and/or pressing, can be cooled, at pressure, to room temperature (e.g., 25° C.).

The amount of the resin composition in the impregnated substrates can be about 0.1 wt %, about 1 wt %, about 10 wt %, or about 20 wt % to about 70 wt %, about 80 wt %, about 90 wt %, or about 99 wt %, based on the combined weight of the substrates and the resin composition. For example, the impregnated substrates can include about 0.1 wt % to about 5 wt %, about 5 wt % to about 15 wt %, about 15 wt % to about 25 wt %, about 25 wt % to about 35 wt %, about 35 wt % to about 55 wt %, about 55 wt % to about 65 wt %, about 65 wt % to about 75 wt %, about 75 wt % to about 85 wt %, about 85 wt % to about 95 wt %, or about 95 wt % to about 99 wt % of the resin composition, based on the weight of the substrates and the resin composition. One or more solvents can be added, as necessary, to maintain the solubility of the resin composition. The addition of a solvent can control or adjust the degree the resin composition penetrates into the substrates.

The resin composition, when applied to the substrate, can have a widely varying solids concentration. For example, the solids concentration of the resin composition can be about 1 wt % to about 99 wt %. In another example, the resin composition can have a solids concentration of about 5 wt %, about 20 wt %, or about 30 wt % to about 50 wt %, about 60 wt %, about 75 wt %, or about 99 wt %, based on the total weight of the resin composition. In another example, the resin composition can have a solids concentration of about 7 wt % to about 25 wt %, about 12 wt % to about 33 wt %, about 25 wt % to about 40 wt %, about 31 wt % to about 44 wt % to about 40 wt % to about 65 wt %, about 47 wt % to about 63 wt %, about 65 wt % to about 75 wt %, about 58 wt % to about 77 wt %, or about 75 wt % to about 95 wt %, based on the total weight of the resin composition. In another example, resin composition can have a solids concentration of about 90 wt % or more, about 95 wt % or more, about 98 wt % or more, about 99 wt % or more, about 99.5 wt % or more, about 99.9 wt % or more, or about 100 wt %, based on the total weight of the resin composition.

The resin composition can have pH of about 1, about 2, about 3, about 4, about 5, about 6, about 7 to about 8, about 9, about 10, about 11, about 12, or about 13. In another example, the resin composition can have a pH of about 1 to about 2, about 2 to about 3, about 3 to about 4, about 4 to about 5, about 5 to about 6, about 6 to about 7, about 7 to about 8, about 8 to about 9, about 9 to about 10, about 10 to about 11, about 11 to about 12, or about 12 to about 13, when applied to the substrates.

The resin composition can be used to produce the composite products via conventional or accelerated batch processes. For example, the resin composition can be used to produce laminate products via continuous, low-pressure laminating processes or continuous, high-pressure laminating processes.

The composite product can be sanded, cut to size, and/or otherwise additionally finished or processed for use as decorative surfaces for desktops, tabletops, wall panels, and the like. The composite product can be glued to a base substrate such as particleboard with adhesives such as contact cement or urea-based adhesives. The composite product can flat or the composite product can be made in such a manner so as to render them post-formable by the application of heat.

The composite product can be a decorative laminate. The decorative laminate can include: one or more overlay sheets, one or more decorative sheets, and one or more core sheets. The overlay can be a layer of rayon or paper. The decorative sheet can be paper that has been dyed or has a decorative image thereon. The decorative sheet can have a basis weight of about 16 g/m$^2$ to about 160 g/m$^2$ or about 80 g/m$^2$ to about 145 g/m$^2$. The core sheet can be or include one or more sheets of kraft paper. The overlay sheets, the decorative sheets, and/or the core sheets can be impregnated with the resin composition. The decorative laminate can be at least partially cured, and, thereafter, can be post-formed and cured completely.

A melamine formaldehyde resin can be used for impregnating decorative sheets and/or overlay sheets in the manufacture of decorative laminates because of their transparency, toughness, light stability, and relatively low cost. The impregnation of the melamine formaldehyde resin into the decorative sheets and/or overlay sheets can be accomplished in one or more stages. For a two stage impregnation, the first stage can include coating the decorative sheets and/or overlay sheets with an aqueous solution of melamine formaldehyde resin having a solids content of about 10 wt % to about 30 wt % such as about 15 wt % to about 25 wt %. The melamine formaldehyde resin can be applied to the backside of the decorative sheets and/or overlay sheets so that no strike-through of the resin to the surface of the paper occurs. The second stage, which can be made either after drying the sheet formed in the first stage or in-line with and immediately after the first stage, with or without intermediate drying, can include applying a second melamine formaldehyde resin. The second melamine formaldehyde resin used in the second stage can be the same or different than that used in the first stage. The decorative sheet can be impregnated in the second stage in an amount of about 25 wt % to about 50 wt %, e.g., about 30 wt % to about 45 wt %, to produce a total resin content resulting from the two applications of about 55 wt % to about 60 wt % and a volatile content of about 5 wt % to about 8 wt %. Various additives may be added to the decorative sheet first and/or second application of resin in order to optimize their impregnation or other properties. Additives can include, but are not limited to, blocking agents, wetting agents, thickeners and dispersing agents fall within the category of useful additives.

The core sheets can include about 1 to about 15 sheets impregnated with the resin composition. For example, the core sheet or layer can be a single sheet or can include 2, 3, 4, 5, 6, 7, 8, 9, 10, 11, 12, 13, 14, 15, or more sheets. The core sheets can include an optional reinforcing material of randomly oriented fibers with the decorative sheet positioned thereon.

The impregnation of the overlay, the decorative sheet, and the core sheets can be conducted continuously from rolls of these materials. Upon passing through the impregnation baths, the sheets can be dried in a suitable hot air drying oven and rewound into rolls useful as feeds to the heat and pressure consolidation stage of the laminate production.

The impregnated decorative sheet and the impregnated core sheets can be passed through one or more ovens to increase the molecular weight of the resin composition and/or to reduce levels of volatiles. This juncture is conventionally called the "B-Stage." The B-stage can reduce the weight of the resin composition in an amount of about 1 wt % to about 15 wt % or about 5 wt % to about 10 wt %. However, the water content of the resin composition can be low enough that further drying of resin can be unnecessary. Said another way, the water content of the resin composition can be low enough that the B-staging process can be avoided.

The sheets can be removed from the drying zone and cut to size, stacked, and consolidated using a heated, high-pressure press. The press can be brought up to a pressure of about 1,300 kPa to about 14,000 kPa and can be heated up to a temperature of about 100° C. to about 275° C. or about 120° C. to 175° C. for a time period of about 5 seconds to about 60 minutes, e.g., about 30 seconds to about 1 minute or about 30 seconds to about 60 minutes. This can be done to consolidate the multiple paper layers and cure the resins. At the end of that time period the press can be cooled and the pressure can be released.

When the laminates are produced in a continuous manner, the decorative sheet and core sheets, impregnated as described above, optionally, in conjunction with a reinforcing material, can be fed continuously in correct juxtaposition between heated belts of a double-belt press. A conventional high pressure laminating texturizing release sheet may be interposed between the decorative sheet and the belt. The release sheet may be rolled and re-used upon exiting the press. When no release sheet is used, the belt can be pre-treated with a suitable release agent. Pressure can be exerted against the back of the belts and through them to the sheets being laminated. The sheets can be held and transported by the belts while being heated and pressure consolidated at a pressure. The exertion of pressure in the belt press can be accomplished, at least in part, via hydraulic seals that can contain the pressure medium, e.g., air. Alternatively, the laminates can be heat and pressure consolidated in a batch process utilizing conventional laminating presses operating at pressures below about 5,500 kPa. Upon exiting the press, the consolidated laminate can be separated from the release paper, if used, and passed over cooling rolls to a sanding station where the back side can be lightly sanded. From the sander, the laminate can be edge trimmed and readied for shipment to a consumer.

The laminates can be post-formed by heating at about 118° C. to about 205° C., bending, and cooling. The post-forming can cure resin composition to the C-stage. The laminates can be employed, after being sanded and cut to size, as decorative surfaces for desktops, counter tops, desk tops, cabinet doors, tabletops, wall panels and the like by adhering them to a substrate, such as thin board, plywood, steel, particle board, or other material, with conventional adhesives, such as urea adhesives. The laminates can be used to form counter tops where the front edge is formed into a lip and the back edge is formed up into a back-splash area. The thickness of these laminates can be about 0.5 mm to about 10 mm or more.

The resin composition can be suitable for making commercial laminates such as FORMICA® available from the Diller Corporation. The resin composition can be suitable for making composite products according to the methods discussed and described in U.S. Pat. Nos. 3,220,916; 3,616,021; 4,005,239; 4,076,566; 4,473,613; 4,530,883; 4,636,443; 4,713,299; 5,456,949; and 7,081,300.

In one or more embodiments, other products that can include an at least partially cured resin composition can include a single substrate or a laminate of two or more substrates. Single substrates saturated with the resin(s) can be used to produce products such as oil filters, overlays, electrical laminates, and/or paint roller tubes. For example, the resin composition can be applied to a substrate, e.g., paper, to saturate the substrate for oil filters, overlay substrates, and paint roller tube applications.

The resin composition can also be used to make consolidated or composite lignocellulosic products, e.g., wood products. Illustrative lignocellulosic composite products can include, but are not limited to, plywood, engineered lumber, oriented strand board, particle board, and the like. The resin composition can also be used to as an abrasives coating resin. In the manufacture of OSB and particleboard, for example, the resin composition can improve performance of the consolidated product after accelerated an aging test such as D4. The resin composition can provide a more flexible bond that can reduce break down of adhesion as the wood swells, thus increasing retention of bond strength. Post-formable hardboard can be made in which the resin composition is partially cured in the flat panels during pressing and fully cured during a subsequent pressing in a mold. The resin composition could provide a flexible adhesive that can improve the post formability of the hardboard.

The resin composition can also be used to make open or closed cell foams when cured. Such foams can be used to make floral foam supports for supporting flower stems in water, for example. The foam can to soak up water in an amount many times the weight of the foam to provide water for the flowers. The foam can be, for example, open cell foam with perforations in cell walls. Other foams that can be made from the resin composition can include dense foams. The dense foams can be used to make models similar to balsa wood, foam to hold jewelry, foam to make molds for foot prosthetics, and closed cell foam for barrier and insulation type properties.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

A standard phenol-formaldehyde resin (Control), two comparative phenol-formaldehyde resins that were mixed with a sucrose (C1 and C2), and two inventive phenol-formaldehyde resins that were mixed with glucose (Ex. 1 and Ex. 2) were prepared. The properties of the resin compositions are shown in Table 1 below.

Preparation of the Control Resin

To a reaction vessel about 1,426.8 grams of phenol and about 1,639.0 grams of formaldehyde were added. The mixture was warmed to about 60° C. and about 39.7 grams of a 50% caustic solution was added over 30 minutes while the reaction mixture was allowed to exotherm to about 65° C. A second caustic charge of about 39.7 grams was added over about 45 minutes while the reaction mixture was allowed to exotherm to about 80° C. The reaction was allowed to progress until a resin that had a Gardner-Holt viscosity of about A1-A was obtained. The Gardner-Holt viscosity can be determined by a Gardner-Holt bubble viscosity tube with the sample reduced to 50% solids in a solvent, e.g., 1-methoxy-2-propanol. The resin was cooled to a temperature of about 50° C. to about 55° C. During the cooling process about 44.0 grams of urea and about 175.0 grams of triazone (cyclic urea formaldehyde prepolymer described in U.S. Pat. No. 6,245,438) were added to the resin. The resin was then vacuum distilled to remove water and cooled to about 25° C. provide a distilled resin that had a refractive index of about 1.5525. The pH of the distilled resin was adjusted to about 8 using an 18% hydrochloric acid solution to provide the Control resin.

Preparation of Example 1 Resin

To a reaction vessel about 1,399.0 grams of phenol and about 1,563.2 g of formaldehyde were added. The mixture was warmed to about 60° C. and about 39.0 grams of a 50% caustic solution was added over about 30 minutes while the reaction mixture was allowed to exotherm to about 65° C. A second caustic charge of about 39 grams was added over about 45 minutes while the reaction mixture was allowed to exotherm to about 80° C. The reaction was allowed to progress until a resin that had a Gardner-Holt viscosity of about A1-A was obtained. The resin was cooled to a temperature of about 50° C. to about 55° C. During the cooling process about 77.2 grams of urea and about 38.6 grams of the triazone used in preparation of the Control example were added to the resin. The resin was then vacuum distilled to remove water to provide a distilled resin, which had a refractive index of about 1.5525. Before cooling the distilled resin, about 228.0 grams of dextrose monohydrate was added and reacted for about 30 minutes to about 45 minutes after which the resin was cooled to about 25° C. The pH of the resin was then adjusted to about 8 using 18% hydrochloric acid solution to provide the Example 1 resin.

Preparation of Comparative Example 1

To a reaction vessel about 1,374.1 grams of phenol and about 1,534.5 grams of formaldehyde were added. The mixture was warmed to about 60° C. and about 38.2 grams of a 50% caustic solution was added over about 30 minutes while the reaction mixture was allowed to exotherm to about 65° C. A second caustic charge of about 38.2 grams was added over about 45 minutes while the reaction mixture was allowed to exotherm to about 80° C. The reaction was allowed to progress until a resin that had a Gardner-Holt viscosity of about A1-A was obtained. The resin was cooled to a temperature of about 50° C. to about 55° C. During the cooling process about 64.0 grams of urea and about 32.0 grams of the triazone used in preparation of the Control example were added to the resin. The resin was then vacuum distilled to remove water to provide a distilled resin, which had a refractive index of about 1.5525. Before cooling the distilled resin, about 288.0 grams of sucrose was added and reacted for about 30 to about 45 minutes after which the resin was cooled to about 25° C. The pH of the resin was then adjusted to about 8 using 18% hydrochloric acid to provide the Comparative Example 1 resin.

Preparation of Example 2 Resin

To a reaction vessel about 1,380.9 grams of phenol and about 1,586.3 grams of formaldehyde was added. The mixture was warmed to about 60° C. at which time about 38.4 grams of a 50% caustic solution was added over about 30 minutes while the reaction mixture was allowed to exotherm to 65° C. A second caustic charge of about 38.4 grams was added over about 45 minutes while the reaction mixture was allowed to exotherm to about 80° C. The reaction was allowed to progress until a resin that had a Gardner-Holt viscosity of about A1-A was obtained. The resin was cooled to a temperature of about 50° C. to about 55° C. During the cooling process about 64.3 grams of urea and about 32.2 of the triazone used in preparation of the Control example were added to the resin. The resin was then vacuum distilled to remove water to provide a distilled resin, which had a refractive index of about 1.5525. Before cooling the distilled resin, about 228.0 g of dextrose monohydrate was added and reacted for about 30 minutes to about 45 minutes after which the resin was cooled to about 25° C. The pH of the resin was then adjusted to about 8 using 18% hydrochloric acid to provide the Example 2 resin.

Preparation of Comparative Example 2

To a reaction vessel about 1,355.5 grams of phenol and about 1,557.2 grams of formaldehyde was added. The mixture was warmed to about 60° C. at which time about 37.7 grams of a 50% caustic solution was added over about 30 minutes while the reaction mixture was allowed to exotherm to about 65° C. A second caustic charge of about 37.7 grams was added over about 45 minutes while the reaction mixture was allowed to exotherm to about 80° C. The reaction was allowed to progress until a Gardner-Holt viscosity of about A1-A was obtained. The resin was cooled to a temperature of about 50° C. to about 55° C. During the cooling process about 63.2 grams of urea and about 31.6 grams of the triazone used in preparation of the Control example were added to the resin. The resin was then vacuum distilled to remove water to provide a distilled resin, which had a refractive index of about 1.5525. Before cooling the distilled resin, about 288.9 grams of sucrose was added and reacted for about 30 minutes to about 45 minutes after which the resin was cooled to about 25° C. The pH of the resin was then adjusted to about 8 using 18% hydrochloric acid to provide the Comparative Example 2 resin.

Preparation of Composite Products

For each of the examples a 3-ply kraft laminate product was produced from treated sheets of kraft paper. The kraft paper had a basis weight of about 189 g/m$^2$ and was contacted on both sides to provide the treated sheets. The treated sheets contained about 30 wt % of the resin compositions of each example. The treated sheets had a volatiles content of about 7 wt %. For each example, three of the treated sheets were stacked together and heated to a temperature of about 135° C. while pressed at about 8,620 kPa for about 25 minutes. The blister, formaldehyde emission, formability, and the water absorption values were measured according to the NEMA test methods discussed and described above.

TABLE

| Resin Properties | Control | Ex. 1 | CEx. 1 | Ex. 2 | CEx. 2 |
|---|---|---|---|---|---|
| % Solids | 67.4 | 68.3 | 69.6 | 66.4 | 68.7 |
| Viscosity cPs | 210 | 147 | 191 | 114 | 180 |
| pH | 8.0 | 8.1 | 8.0 | 8.0 | 8.1 |
| Free Formaldehyde, wt % | 0.4 | 0.6 | 0.7 | 0.7 | 0.5 |
| Free Phenol, wt % | 5.7 | 6.8 | 6.8 | 5.8 | 5.2 |
| Gel Time at 127° C., minutes | 18.0 | 16.5 | 15.5 | 16.2 | 16.0 |
| DSC in Degrees Celsius Onset and (Max) | 122 (154) | 118 (153) | 120 (155, 223) | 118, (155) | 119 (156, 220) |
| MN | 314 | 293 | 293 | 283 | 282 |
| MW | 411 | 365 | 366 | 343 | 343 |
| MZ | 567 | 478 | 482 | 438 | 438 |
| Treated Kraft Properties | | | | | |
| Basis Weight g/m$^2$ | 282 | 285 | 284 | 289 | 281 |
| Volatile Content % | 7.19 | 8.4 | 7.5 | 7 | 8.1 |
| Resin Content %, Humid (Dry) | 30.5 (26.9) | 31.0 (26.0) | 30.9 (27.2) | 32.0 (28.7) | 30.2 (26.0) |
| Laminate Grade 10 press cycle (3 ply kraft laminate product) Properties | | | | | |
| Blister time (minimum 40 Seconds NEMA) | 49.4 | 46.4 | 47.6 | 49.9 | 50.3 |
| Emission Smell 1-5, 5 being worst | 4 | 1 | 5 | 3 | 2 |
| HCHO Emissions - mg/L (ppm) after 3:1 dilution. Desiccator testing at 25 C., 16 hours | 6.9 | 1.5 | >8.0 | 1.5 | 6.8 |
| Moisture Absorption % | >50 over limit | 30 | Fail | 27 | 23 |
| Post Formability of the 3 ply kraft laminate product at a temperature of about 162.8° C.: 0 to 6, with 6 being the worst cracking, inside/outside the press | | | | | |
| CD 90° bend, 1 mm radius | Fail | Fail | Fail | Fail | Fail |
| CD 3 mm (²/₁₆in) radius | 6/6 | 0+/1 | 2/2 | 5/2 | 2/3 |
| CD 90° bend, 2.8 mm radius | 4/4 | 0+/0+ | 1/0+ | 0+/1 | 1/0+ |
| MD 90° 1 mm radius bend | 6/6 | 1/1 | 2/2 | 1/2 | 2/25 |

As shown in the Table, Examples 1 and 2 showed a surprising and unexpected improvement in post formability as compared to the Control and the Comparative Examples 1 and 2. Additionally, the amount of formaldehyde emitted from the composite products prepared in Examples 1 and 2 was significantly and unexpectedly lower as compared to the Control and the Comparative Examples 1 and 2. The composite products of Examples 1 and 2 also had an improved swelling performance as compared to the Control and the Comparative Examples 1 and 2.

Embodiments of the present disclosure further relate to any one or more of the following paragraphs:

1. A method for making a composite product, comprising: contacting a plurality of cellulosic sheets with a resin composition comprising one or more phenolic resins and one or more monosaccharides; and at least partially curing the resin composition to produce a composite product.

2. The method according to paragraph 1, wherein the one or more monosaccharides comprise glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose, fructose, psicose, dendroketose, sorbose, tagatose, gentiobiose, sedoheptulose, or any mixture thereof.

3. The method according to paragraph 1 or 2, wherein the one or more monosaccharides comprise glucose.

4. The method according to any one of paragraphs 1 to 3, wherein the resin composition is disposed between the plurality of cellulosic sheets.

5. The method according to any one of paragraphs 1 to 4, wherein at least one cellulosic sheet in the plurality of cellulosic sheets is saturated with the resin composition.

6. The method according to any one of paragraphs 1 to 5, wherein the composite product is a post-formable laminate.

7. The method according to any one of paragraphs 1 to 6, wherein the one or more phenolic resins comprise a phenol-formaldehyde resin having a molar ratio of formaldehyde to phenol of about 1.01:1 to about 4:1.

8. The method according to any one of paragraphs 1 to 7, wherein the resin composition has a viscosity of about 75 cP to about 350 cP at a temperature of 25° C.

9. The method according to any one of paragraphs 1 to 8, wherein the resin composition further comprises water in an amount of about 8 wt % to about 25 wt %, based on the combined weight of the one or more phenolic resins, the one or more monosaccharides, and the water.

10. The method according to any one of paragraphs 1 to 9, wherein at least partially curing the resin composition comprises heating the plurality of cellulosic sheets contacted with the resin composition to a temperature of about 25° C. to about 50° C. for about 10 seconds to about 150 seconds.

11. The method according to any one of paragraphs 1 to 10, wherein the resin composition comprises about 0.5 wt % to about 20 wt % of the one or more monosaccharides, based on the combined weight of the one or more phenolic resins and the one or more monosaccharides.

12. The method according to any one of paragraphs 1 to 11, wherein the one or more phenolic resins is a phenol-formaldehyde resin, wherein the phenol-formaldehyde resin comprises a first phenol formaldehyde resin and a second phenol-formaldehyde resin, and wherein the first and second phenol-formaldehyde resins have a different molar ratio of phenol to formaldehyde with respect to one another.

13. A method for making a post-formed laminate, comprising: contacting a plurality of paper sheets with a resin composition comprising a phenol-formaldehyde resin and glucose, wherein the phenol-formaldehyde resin has a molar ratio of formaldehyde to phenol of about 1.01:1 to about 4:1; at least partially curing the resin composition to produce a post-formable laminate; and bending and heating the post-formable laminate to a temperature of about 135° C. to about 220° C. for about 3 seconds to about 60 seconds to produce a post-formed laminate.

14. The method according to paragraph 13, wherein the resin composition comprises about 0.5 wt % to about 20 wt % of the glucose, based on the combined weight of the phenol-formaldehyde resin and the glucose.

15. The method according to paragraph 13 or 14, wherein the bending and heating of the post-formable laminate produces a radius of at least 3.175 mm, based on the procedure of NEMA test 3.14 from Standard NEMA Publications Book LD3-2005.

16. A composite product, comprising: a plurality of cellulosic sheets, and an at least partially cured resin composition, wherein the resin composition, prior to curing, comprises one or more phenolic resins and one or more monosaccharides.

17. The composite product according to paragraph 16, wherein the one or more monosaccharides comprise glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose, fructose, psicose, dendroketose, sorbose, tagatose, gentiobiose, sedoheptulose, or any mixture thereof.

18. The composite product according to paragraph 16 or 17, wherein the one or more monosaccharides is glucose.

19. The composite product according to any one of paragraphs 16 to 18, wherein the concentration of the one or more monosaccharides is about 0.5 wt % to about 20 wt %, based on the total weight of the phenol-formaldehyde resin and the one or more monosaccharides.

20. The composite product according to any one of paragraphs 16 to 19, wherein the phenolic resin comprises a phenol-formaldehyde resin having a molar ratio of formaldehyde to phenol of about 1.01:1 to about 4:1.

21. The composite product according to any one of paragraphs 16 to 20, wherein the cellulosic sheets are paper sheets.

22. The composite product according to any one of paragraphs 16 to 21, wherein the composite product is a laminate.

23. The composite product according to any one of paragraphs 16 to 22, wherein the laminate can be bent to a radius of at least 3.175 mm, based on the procedure of NEMA test 3.14 from Standard NEMA Publications Book LD3-1975.

24. A method for making a composite product, comprising: contacting a plurality of cellulosic sheets with a resin composition comprising a phenolic resin and a monosaccharide, wherein the resin composition comprises about 0.5 wt % to about 30 wt % of the monosaccharide, based on a combined weight of the phenolic resin and the monosaccharide; and at least partially curing the resin composition to produce a composite product.

25. A composite product, comprising: a plurality of cellulosic sheets, and an at least partially cured resin composition, wherein the resin composition, prior to curing, comprises one or more phenolic resins and one or more monosaccharides, and wherein the resin composition comprises about 0.5 wt % to about 30 wt % of the monosaccharide, based on a combined weight of the phenolic resin and the monosaccharide.

26. The method or composite product according to paragraph 24 or 25, wherein the monosaccharide comprises glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose, fructose, psicose, dendroketose, sorbose, tagatose, gentiobiose, sedoheptulose, or any mixture thereof.

27. The method or composite product according to any one of paragraphs 24 to 26, wherein the monosaccharide comprises glucose.

28. The method or composite product according to any one of paragraphs 24 to 27, wherein the phenolic resin comprises a phenol-formaldehyde resin having a molar ratio of formaldehyde to phenol of about 1:1 to about 4:1.

29. The method or composite product according to any one of paragraphs 24 to 28, wherein the resin composition has a viscosity of about 75 cP to about 350 cP at a temperature of 25° C.

30. The method or composite product according to any one of paragraphs 24 to 29, wherein at least partially curing the resin composition comprises heating the plurality of cellulosic sheets contacted with the resin composition to a temperature of about 100° C. to about 250° C. for about 5 seconds to about 150 seconds.

31. The method or composite product according to any one of paragraphs 24 to 30, wherein the resin composition comprises about 3 wt % to about 15 wt % of the monosaccharide, based on the combined weight of the phenolic resin and the monosaccharide.

32. The method or composite product according to any one of paragraphs 24 to 31, wherein the phenolic resin comprises a first phenol-formaldehyde resin and a second phenol-formaldehyde resin, and wherein a phenol to formaldehyde molar ratio of the first phenol-formaldehyde resin is different that a phenol to formaldehyde molar ratio of the second phenol-formaldehyde resin.

33. The method or composite product according to any one of paragraphs 24 to 32, wherein the composite product has a formaldehyde emission of 6.5 mg/L or less, as measured according to Desiccator Method ISO/DIS 12460-4.

34. The method or composite product according to any one of paragraphs 24 to 33, wherein the phenolic resin comprises a phenol-formaldehyde resin having a molar ratio of formaldehyde to phenol of about 1.1:1 to about 4:1, wherein the resin composition has a viscosity of about 30 cP to about 500 cP at a temperature of 25° C., wherein the resin composition comprises about 0.1 wt % to about 25 wt % of the monosaccharide, based on the combined weight of the phenolic resin and the monosaccharide, and wherein the composite product has a formaldehyde emission of 10 mg/L or less, as measured according to Desiccator Method ISO/DIS 12460-4.

35. The method or composite product according to any one of paragraphs 24 to 34, wherein the phenolic resin comprises a phenol-formaldehyde resin having a molar ratio of formaldehyde to phenol of about 1.1:1 to about 3:1, wherein the resin composition has a viscosity of about 60 cP to about 300 cP at a temperature of 25° C., wherein the resin composition comprises about 4 wt % to about 7.5 wt % of the monosaccharide, based on the combined weight of the phenolic resin and the monosaccharide, and wherein the composite product has a formaldehyde emission of 6.7 ppm or less, as measured according to Desiccator Method ISO/DIS 12460-4.

36. The method or composite product according to any one of paragraphs 24 to 35, wherein the phenolic resin has a weight average molecular weight of about 200 to about 1,000.

37. The method or composite product according to any one of paragraphs 24 to 36, wherein the resin composition is at least partially cured by contacting the resin composition with one or more acids, one or more bases, one or more catalysts, or any mixture thereof.

38. The method or composite product according to any one of paragraphs 24 to 37, wherein the composite product is a post-formable laminate.

39. The method or composite product according to paragraph 38, further comprising bending the post-formable laminate along a cross-direction of the post-formable laminate to produce a post-formed composite product having a 90° bend without any cracking or crazing, wherein the bend has a radius of 3.175 mm or less, based on the procedure of NEMA test 3.14 from Standard NEMA Publications Book LD3-2005.

40. The method or composite product according to paragraph 38, further comprising bending the post-formable laminate along a machine direction of the post-formable laminate to produce a post-formed composite product having a 90.degree. bend without any cracking or crazing, wherein the bend has a radius of 1 mm or less, based on the procedure of NEMA test 3.14 from Standard NEMA Publications Book LD3-2005.

41. A method for making a composite product, comprising: contacting a plurality of cellulosic sheets with a resin composition comprising a phenol-formaldehyde resin and glucose, wherein the phenol-formaldehyde resin has a molar ratio of formaldehyde to phenol of about 1.1:1 to about 4:1 and a viscosity of about 30 cP to about 500 cP at a temperature of 25° C.; at least partially curing the resin composition to produce a post-formable laminate; heating the post-formable laminate to a temperature of about 135° C. to about 220° C. for about 3 seconds to about 60 seconds; and bending the post-formable laminate while heated to the temperature of about 135° C. to about 220° C. to produce a post-formed composite product.

42. The method according to paragraph 41, wherein the resin composition comprises about 3 wt % to about 10 wt % of the glucose, based on the combined weight of the phenol-formaldehyde resin and the glucose.

43. The method according to paragraph 41 or 42, wherein bending the post-formable laminate forms a bend along a cross-direction of the post-formable laminate that has a radius of 3.175 mm or less, based on the procedure of NEMA test 3.14 from Standard NEMA Publications Book LD3-2005.

44. The method according to any one of paragraphs 41 to 43, wherein the resin composition has a viscosity of about 75 cP to about 350 cP at a temperature of 25° C.

45. The method according to any one of paragraphs 41 to 44, wherein the resin composition comprises about 3 wt % to about 15 wt % of the monosaccharide, based on the combined weight of the phenolic resin and the monosaccharide 46. The method according to any one of paragraphs 41 to 45, wherein the composite product has a formaldehyde emission of 6.5 mg/L or less, as measured according to Desiccator Method ISO/DIS 12460-4.

47. The method according to any one of paragraphs 41 to 46, wherein the phenol-formaldehyde resin has a molar ratio of formaldehyde to phenol of about 1.1:1 to about 3:1, wherein the resin composition has a viscosity of about 60 cP to about 300 cP at a temperature of 25° C., wherein the resin composition comprises about 4 wt % to about 7.5 wt % of the monosaccharide, based on the combined weight of the phenolic resin and the monosaccharide, and wherein the composite product has a formaldehyde emission of 6.7 ppm or less, as measured according to Desiccator Method ISO/DIS 12460-4.

48. The method according to any one of paragraphs 41 to 47, wherein the phenolic resin has a weight average molecular weight of about 200 to about 1,000.

49. The method according to any one of paragraphs 41 to 48, wherein the resin composition is at least partially cured by contacting the resin composition with one or more acids, one or more bases, one or more catalysts, or any mixture thereof.

50. The method according to any one of paragraphs 41 to 49, wherein bending the post-formable laminate forms a bend along a machine direction of the post-formable laminate to produce a post-formed composite product having a 90.degree. bend without any cracking or crazing, wherein the bend has a radius of 1 mm or less, based on the procedure of NEMA test 3.14 from Standard NEMA Publications Book LD3-2005.

51. The method or composite product according to any one of paragraph 24 to 50, wherein the composite product has a formaldehyde emission of 5 mg/L or less, as measured according to Desiccator Method ISO/DIS 12460-4.

52. The method or composite product according to any one of paragraph 24 to 50, wherein the composite product has a formaldehyde emission of 4 mg/L or less, as measured according to Desiccator Method ISO/DIS 12460-4.

53. The method or composite product according to any one of paragraph 24 to 50, wherein the composite product has a formaldehyde emission of 3 mg/L or less, as measured according to Desiccator Method ISO/DIS 12460-4.

54. The method or composite product according to any one of paragraph 24 to 50, wherein the composite product has a formaldehyde emission of 2 mg/L or less, as measured according to Desiccator Method ISO/DIS 12460-4.

55. The method or composite product according to any one of paragraph 24 to 50, wherein the composite product has a formaldehyde emission of about 1 mg/L to about 6.5 mg/L, as measured according to Desiccator Method ISO/DIS 12460-4.

56. The method or composite product according to any one of paragraph 24 to 50, wherein the composite product has a formaldehyde emission of about 1.3 mg/L to about 5 mg/L, as measured according to Desiccator Method ISO/DIS 12460-4.

57. The method or composite product according to any one of paragraph 24 to 50, wherein the composite product has a formaldehyde emission of about 1.5 mg/L to about 4 mg/L, as measured according to Desiccator Method ISO/DIS 12460-4.

58. The method or composite product according to any one of paragraph 24 to 57, wherein the phenolic resin has a weight average molecular weight of about 200 to about 500.

59. The method or composite product according to any one of paragraph 24 to 57, wherein the phenolic resin has a weight average molecular weight of about 200 to about 400.

60. The method or composite product according to any one of paragraph 24 to 57, wherein the phenolic resin has a weight average molecular weight of about 200 to about 350.

61. The method or composite product according to any one of paragraph 24 to 60, wherein the resin composition comprises less than 3 wt %, less than 2 wt %, less than 1 wt %, less than 0.7 wt %, less than 0.5 wt %, less than 0.3 wt %, or less than 0.1 wt % of any disaccharide, based on the total weight of the resin composition.

62. The method or composite product according to any one of paragraph 24 to 61, wherein the resin composition comprises less than 3 wt %, less than 2 wt %, less than 1 wt %, less than 0.7 wt %, less than 0.5 wt %, less than 0.3 wt %, or less than 0.1 wt % of any oligosaccharide, based on the total weight of the resin composition.

63. The method or composite product according to any one of paragraph 24 to 62, wherein the resin composition comprises less than 3 wt %, less than 2 wt %, less than 1 wt %, less than 0.7 wt %, less than 0.5 wt %, less than 0.3 wt %, or less than 0.1 wt % of any polysaccharide, based on the total weight of the resin composition.

64. The method or composite product according to any one of paragraph 24 to 63, wherein a combined amount of any disaccharide, any oligosaccharide, and any polysaccharide in the resin composition is less than 3 wt %, less than 2 wt %, less than 1 wt %, less than 0.7 wt %, less than 0.5 wt %, less than 0.3 wt %, or less than 0.1 wt %, based on the total weight of the resin composition.

65. The method or composite product according to any one of paragraph 24 to 64, wherein the resin composition is free of any disaccharide, any oligosaccharide and any polysaccharide.

66. The method or composite product according to any one of paragraph 24 to 65, wherein the resin composition has a viscosity of about 90 cP to about 300 cP at a temperature of 25° C.

67. The method or composite product according to any one of paragraph 24 to 65, wherein the resin composition has a viscosity of about 100 cP to about 250 cP at a temperature of 25° C.

68. The method or composite product according to any one of paragraph 24 to 65, wherein the resin composition has a viscosity of about 110 cP to about 160 cP at a temperature of 25° C.

69. The method or composite product according to any one of paragraph 24 to 65, wherein the resin composition has a viscosity of about 110 cP to about 150 cP at a temperature of 25° C.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for making a composite product, comprising:
   contacting a plurality of cellulosic sheets with a resin composition comprising a phenolic resin and a monosaccharide, wherein the resin composition comprises about 0.5 wt % to about 30 wt % of the monosaccharide, based on a combined weight of the phenolic resin and the monosaccharide;
   partially curing the resin composition to produce a post-formable laminate;
   heating the post-formable laminate to a temperature of about 118° C. to about 220° C.; and
   bending the post-formable laminate at the temperature of about 118° C. to about 220° C. to produce a post-formed composite product.

2. The method of claim 1, wherein the monosaccharide comprises glyceraldehyde, erythrose, threose, erythrulose, ribose, arabinose, xylose, lyxose; ribulose, arabulose, xylulose, lyxulose, glucose, mannose, galactose, allose, altrose, talose, gulose, idose, fructose, psicose, dendroketose, sorbose, tagatose, gentiobiose, sedoheptulose, or any mixture thereof.

3. The method of claim 1, wherein the monosaccharide comprises glucose.

4. The method of claim 1, wherein the phenolic resin comprises a phenol-formaldehyde resin having a molar ratio of formaldehyde to phenol of about 1:1 to about 4:1.

5. The method of claim 1, wherein the resin composition has a viscosity of about 75 cP to about 350 cP at a temperature of 25° C.

6. The method of claim 1, wherein partially curing the resin composition comprises heating the plurality of cellulosic sheets contacted with the resin composition to a temperature of about 100° C. to about 250° C. for about 5 seconds to about 150 seconds.

7. The method of claim 1, wherein the plurality of cellulosic sheets comprises delignified cellulose fibers, wherein the resin composition comprises about 3 wt % to about 15 wt % of the monosaccharide, based on the combined weight of the phenolic resin and the monosaccharide, and wherein the phenolic resin comprises a phenol-formaldehyde resin having a molar ratio of formaldehyde to phenol of about 1.1:1 to about 4:1.

8. The method of claim 1, wherein the phenolic resin comprises a first phenol-formaldehyde resin and a second phenol-formaldehyde resin, and wherein a phenol to formaldehyde molar ratio of the first phenol-formaldehyde resin is different than a phenol to formaldehyde molar ratio of the second phenol-formaldehyde resin.

9. The method of claim 1, wherein the phenolic resin comprises a phenol-formaldehyde resin having a molar ratio of formaldehyde to phenol of about 1.1:1 to about 4:1, wherein the resin composition has a viscosity of about 30 cP to about 500 cP at a temperature of 25° C., wherein the resin composition comprises about 0.1 wt % to about 25 wt % of the monosaccharide, based on the combined weight of the phenolic resin and the monosaccharide, and wherein the composite product has a formaldehyde emission of 10 mg/L or less, as measured according to Desiccator Method ISO/DIS 12460-4.

10. The method of claim 1, wherein the plurality of cellulosic sheets comprises kraft paper, wherein the phenolic resin comprises a phenol-formaldehyde resin having a molar ratio of formaldehyde to phenol of about 1.1:1 to about 3:1, wherein the resin composition has a viscosity of about 60 cP to about 300 cP at a temperature of 25° C., wherein the resin composition comprises about 4 wt % to about 7.5 wt % of the monosaccharide, based on the combined weight of the phenolic resin and the monosaccharide, wherein the monosaccharide comprises glucose, and wherein the composite product has a formaldehyde emission of 6.7 ppm or less, as measured according to Desiccator Method ISO/DIS 12460-4.

11. The method of claim 1, wherein the resin composition is partially cured by contacting the resin composition with one or more acids, one or more bases, one or more catalysts, or any mixture thereof.

12. The method of claim 1, wherein:
the plurality of cellulosic sheets comprises delignified cellulose fibers,
the resin composition comprises about 4 wt % to about 8 wt % of the monosaccharide, based on the combined weight of the phenolic resin and the monosaccharide,
the phenolic resin comprises a phenol-formaldehyde resin having a molar ratio of formaldehyde to phenol of about 1.1:1 to about 4:1, and
the post-formable laminate is bent along a cross-direction or a machine direction of the post-formable laminate to produce a post-formed composite product having a bend that has a radius of 4 mm or less, based on the procedure of NEMA test 3.14 from Standard NEMA Publications Book LD3-2005.

13. The method of claim 12, wherein the post-formable laminate is bent along a cross-direction of the post-formable laminate to produce a post-formed composite product having a 90° bend without any cracking or crazing, wherein the 90° bend has a radius of 3.175 mm or less, based on the procedure of NEMA test 3.14 from Standard NEMA Publications Book LD3-2005.

14. The method of claim 12, wherein the post-formable laminate is bent along a machine direction of the post-formable laminate to produce a post-formed composite product having a 90° bend without any cracking or crazing, wherein the 90° bend has a radius of 1 mm or less, based on the procedure of NEMA test 3.14 from Standard NEMA Publications Book LD3-2005.

15. A method for making a composite product, comprising:
contacting a plurality of cellulosic sheets with a resin composition comprising a phenol-formaldehyde resin and glucose, wherein the phenol-formaldehyde resin has a molar ratio of formaldehyde to phenol of about 1.1:1 to about 4:1 and a viscosity of about 30 cP to about 500 cP at a temperature of 25° C.;
partially curing the resin composition to produce a post-formable laminate;
heating the post-formable laminate to a temperature of about 135° C. to about 220° C. for about 3 seconds to about 60 seconds; and
bending the post-formable laminate at the temperature of about 135° C. to about 220° C. to produce a post-formed composite product.

16. The method of claim 15, wherein the resin composition comprises about 3 wt % to about 10 wt % of the glucose, based on the combined weight of the phenol-formaldehyde resin and the glucose, and wherein the plurality of lignocellulosic sheets comprises delignified cellulose fibers.

17. The method of claim 15, wherein bending the post-formable laminate forms a bend along a cross-direction or a machine direction of the post-formable laminate that has a radius of 3.175 mm or less, based on the procedure of NEMA test 3.14 from Standard NEMA Publications Book LD3-2005.

18. A composite product, comprising:
a plurality of cellulosic sheets, and
a cured resin composition, wherein the cured resin composition, prior to curing, comprises one or more phenolic resins and about 0.5 wt % to about 30 wt % of one or more monosaccharides, based on a combined weight of the one or more phenolic resins and the one or more monosaccharides, wherein the composite product comprises a bend having a radius of 4 mm or less along a cross-direction or a machine direction of the composite product, based on the procedure of NEMA test 3.14 from Standard NEMA Publications Book LD3-2005.

19. The composite product of claim 18, wherein:
the plurality of cellulosic sheets comprises delignified cellulose fibers,
the one or more phenolic resins comprises a phenol-formaldehyde resin having a molar ratio of formaldehyde to phenol of about 1.1:1 to about 4:1,
the resin composition comprises about 4 wt % to about 8 wt % of the one or more monosaccharides, based on the combined weight of the one or more phenolic resins and the one or more monosaccharides, and
the one or more monosaccharides comprises glucose.

20. The composite product of claim 18, wherein:
the plurality of cellulosic sheets comprises kraft paper,
the one or more phenolic resins comprises a phenol-formaldehyde resin having a molar ratio of formaldehyde to phenol of about 1.1:1 to about 4:1,
the resin composition comprises about 4 wt % to about 8 wt % of the one or more monosaccharides, based on the combined weight of the one or more phenolic resins and the one or more monosaccharides, and
the one or more monosaccharides comprises glucose.

* * * * *